US012563571B2

(12) United States Patent
Zhang et al.

(10) Patent No.: US 12,563,571 B2
(45) **Date of Patent: \*Feb. 24, 2026**

(54) CONTROL INFORMATION TRANSMISSION METHOD, RELATED APPARATUS, AND COMPUTER STORAGE MEDIUM

(71) Applicant: HUAWEI TECHNOLOGIES CO., LTD., Guangdong (CN)

(72) Inventors: Xu Zhang, Beijing (CN); Jianguo Wang, Beijing (CN); Lixia Xue, Beijing (CN); Zheng Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/786,330

(22) Filed: Jul. 26, 2024

(65) Prior Publication Data

US 2025/0031212 A1     Jan. 23, 2025

Related U.S. Application Data

(63) Continuation of application No. 18/329,501, filed on Jun. 5, 2023, now Pat. No. 12,089,230, which is a (Continued)

(30) Foreign Application Priority Data

May 4, 2017   (CN) ......................... 201710309765.7

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0007* (2013.01); *H04W 72/0446* (2013.01); (Continued)

(58) Field of Classification Search
CPC ..... H04W 80/08; H04W 8/24; H04W 72/042; H04W 72/0446; H04W 72/0453; (Continued)

(56) References Cited

U.S. PATENT DOCUMENTS 10,966,281 B2 * 3/2021 Zhang ................. H04W 72/231
11,122,557 B2 * 9/2021 Zhang ............... H04W 72/0453
(Continued)

FOREIGN PATENT DOCUMENTS

CN          101242625          8/2008
CN          102082600          6/2011
(Continued)

OTHER PUBLICATIONS

3GPP TS 38.331 V0.0.2 (Mar. 2017), "3rd Generation Partnership Project; Technical Specification Group Radio Access Network; NR;Radio Resource Control (RRC); Protocol specification(Release 15)" Mar. 2017, 13 pages.
(Continued)

*Primary Examiner* — Afshawn M Towfighi
(74) *Attorney, Agent, or Firm* — Fish & Richardson P.C.

(57) ABSTRACT

A control information transmission method, apparatus, and systems are disclosed. An example method includes: determining configuration information of a control channel, wherein the configuration information comprises at least one of frequency domain information or time domain information, the at least one of frequency domain information or time domain information indicates a time-frequency resource occupied by the control channel, and the configuration information further comprises indication information
(Continued)

One symbol

One subcarrier

Third physical resource block 103

Second physical resource block 102

First physical resource block 101

Frequency domain

Time domain

▨ Resource element carrying control information
⊠ Resource element carrying control information indicating a quantity of at least one resource element set, wherein the time-frequency resource occupied by the control channel comprises the at least one resource element set; mapping control information to one or more of the at least one resource element set based on the configuration information; sending the configuration information to a terminal device; and sending the control information to the terminal device.

27 Claims, 14 Drawing Sheets

Related U.S. Application Data continuation of application No. 17/473,665, filed on Sep. 13, 2021, now Pat. No. 11,671,986, which is a continuation of application No. 16/672,895, filed on Nov. 4, 2019, now Pat. No. 11,122,557, which is a continuation of application No. PCT/CN2018/085709, filed on May 4, 2018.

(51) Int. Cl.

| | |
|---|---|
| *H04W 72/0446* | (2023.01) |
| *H04W 72/0453* | (2023.01) |
| *H04W 76/27* | (2018.01) |
| *H04W 80/08* | (2009.01) |

(52) U.S. Cl.
CPC ....... *H04W 72/0453* (2013.01); *H04W 76/27* (2018.02); *H04W 80/08* (2013.01)

(58) Field of Classification Search
CPC .. H04W 56/00; H04W 72/044; H04L 1/1864; H04L 1/1854; H04L 1/1812; H04L 5/0082; H04L 5/1469; H04L 5/0092; H04L 5/0007; H04L 5/0053; H04B 7/2643

See application file for complete search history.

(56) References Cited

U.S. PATENT DOCUMENTS

| | | | |
|---|---|---|---|
| 2006/0215780 A1* | 9/2006 | Yeon | H04L 27/2624 375/260 |
| 2013/0039299 A1 | 2/2013 | Papasakellariou et al. | |
| 2013/0195034 A1 | 8/2013 | Noh et al. | |
| 2013/0322413 A1* | 12/2013 | Pelletier | H04L 5/0091 370/336 |
| 2015/0003365 A1 | 1/2015 | Seo | |
| 2015/0131560 A1 | 5/2015 | Von Elbwart et al. | |
| 2015/0181569 A1 | 6/2015 | Kim et al. | |
| 2017/0012664 A1 | 1/2017 | Casey | |
| 2018/0102827 A1 | 4/2018 | Noh et al. | |
| 2018/0263024 A1 | 9/2018 | John Wilson et al. | |
| 2019/0109625 A1 | 4/2019 | Subramanian et al. | |

| | | | |
|---|---|---|---|
| 2019/0199496 A1 | 6/2019 | Qin et al. | |
| 2019/0313273 A1 | 10/2019 | Sharma et al. | |
| 2019/0326971 A1 | 10/2019 | Tang | |
| 2019/0349067 A1* | 11/2019 | Huang | H04B 7/0697 |
| 2020/0099438 A1 | 3/2020 | Takano | |

FOREIGN PATENT DOCUMENTS

| | | |
|---|---|---|
| CN | 102271402 | 12/2011 |
| CN | 102316068 | 1/2012 |
| CN | 102395206 | 3/2012 |
| CN | 102469589 | 5/2012 |
| CN | 103249087 | 8/2013 |
| CN | 103650368 | 3/2014 |
| CN | 104054313 | 9/2014 |
| CN | 106549738 | 3/2017 |
| EP | 2879430 | 6/2015 |
| WO | WO 2014019144 | 2/2014 |
| WO | WO 2014107062 | 7/2014 |
| WO | WO 2014166110 | 10/2014 |

OTHER PUBLICATIONS

Ericsson, "On NR-PDCCH Structure," 3GPP TSG-RAN WG1 Meeting #88bis, R1-1706026, Spokane, USA, Apr. 3-7, 2017, 3 pages.

Extended European Search Report issued in European Application No. 18795260.1 on Mar. 23, 2020, 10 pages.

Huawei et al., "Discussion on PCFICH-like control channel," 3GPP TSG RAN WG1 NR Ad Hoc Meeting, R1-1700398, Spokane, USA, Jan. 16-20, 2017, 3 pages.

Huawei et al., "Resource multiplexing of downlink control and data," 3GPP TSG RAN WG1 Meeting #88bis, R1-1705063, Spokane, USA, Apr. 3-7, 2017, 3 pages.

Huawei et al., "Search space design considerations," 3GPP TSG RAN WG1 Meeting #88bis, R1-1704202, Spokane, USA, Apr. 3-7, 2017, 4 pages.

Huawei, HiSilicon, "CCE-to-REG mapping," 3GPP TSG RAN WG1 Meeting #88, R1-1701638, Athens, Greece, Feb. 13-17, 2017, 3 pages.

Nokia et al., "On DL control channel design for shorter TTI operation," 3GPP TSG-RAN WG1 Meeting #88, R1-1702013, Athens, Greece, Feb. 13-17, 2017, 8 pages.

Office Action in Malaysian No. PI2019006430, mailed on May 27, 2024, 4 pages.

Office Action issued in Chinese Application No. 201810910221.0 on Apr. 23, 2019, 13 pages (with English translation).

Office Action issued in Chinese Application No. 201810912192.1 on Oct. 29, 2019, 6 pages (with English translation).

Office Action issued in Chinese Application No. 202011495072.X on Jun. 10, 2021, 6 pages.

Office Action issued in Indian Application No. 201947045817 on Oct. 6, 2021, 7 pages.

PCT International Search Report and Written Opinion issued in International Application No. PCT/CN2018/085709 on Jul. 24, 2018, 17 pages (with English translation).

* cited by examiner

One symbol

One subcarrier

Third physical
resource block 103

Second physical
resource block 102

First physical
resource block 101

Frequency
domain

Time domain

▓ Resource element carrying
control information

▨ Resource element carrying
control information

Third physical
resource block 103

Second physical
resource block 102

First physical
resource block 101

Frequency
domain

Time domain

▨ Resource element carrying
control information

▨ Resource element carrying
control information

Terminal device 202

Network device 201

Terminal device 203

Time

| Radio frame | Radio frame | Radio frame |
|---|---|---|

| Subframe | Subframe | Subframe | ... | Subframe | Subframe |
|---|---|---|---|---|---|

| | |
|---|---|
| (k+11, l) | (k+11, l+1) |
| (k+10, l) | (k+10, l+1) |
| (k+9, l) | (k+9, l+1) |
| (k+8, l) | (k+8, l+1) |
| (k+7, l) | (k+7, l+1) |
| (k+6, l) | (k+6, l+1) |
| (k+5, l) | (k+5, l+1) |
| (k+4, l) | (k+4, l+1) |
| (k+3, l) | (k+3, l+1) |
| (k+2, l) | (k+2, l+1) |
| (k+1, l) | (k+1, l+1) |
| (k, l) | (k, l+1) |

Resource element

Frequency domain

Time domain

FIG. 4i

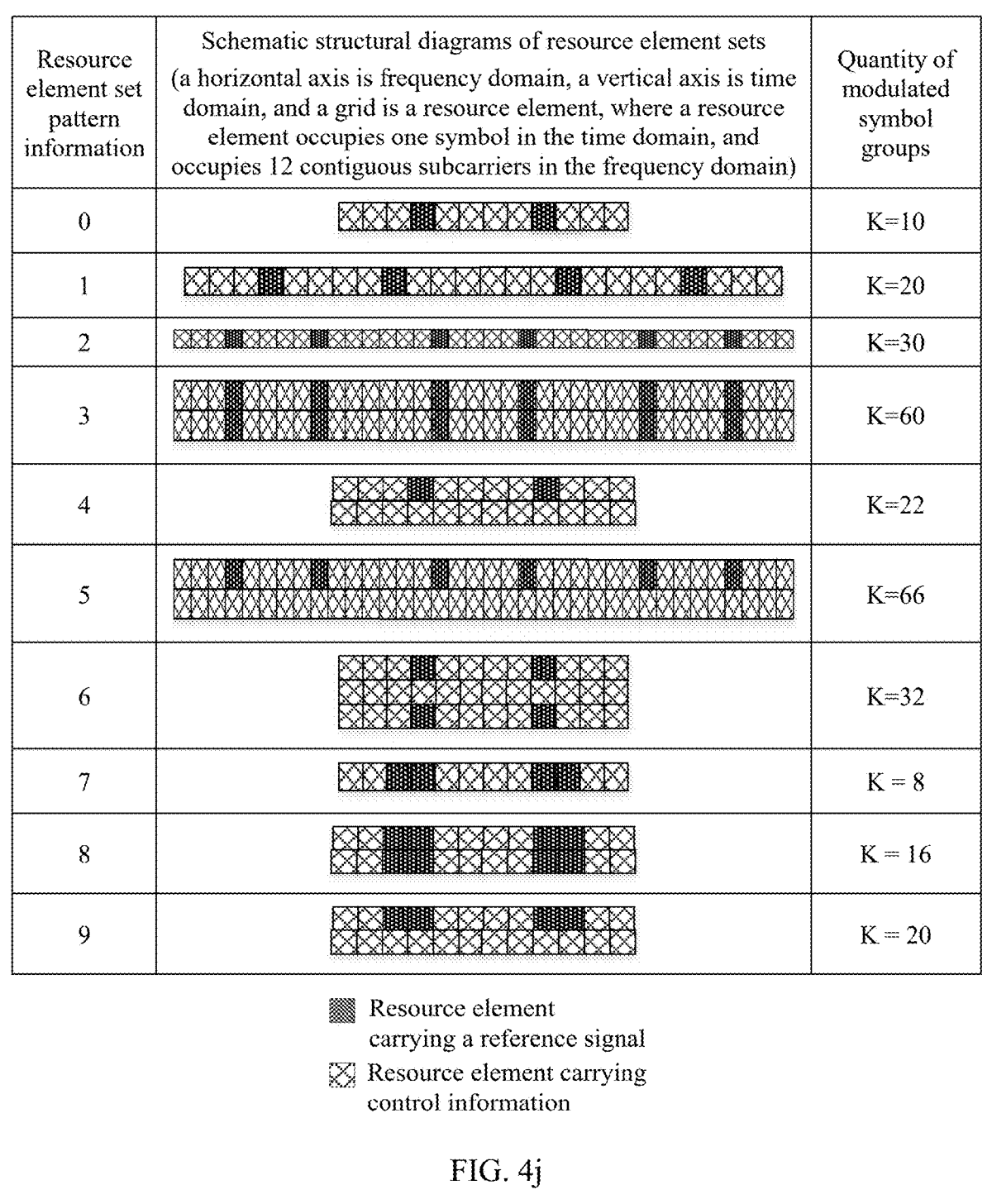

| Resource element set pattern information | Schematic structural diagrams of resource element sets (a horizontal axis is frequency domain, a vertical axis is time domain, and a grid is a resource element, where a resource element occupies one symbol in the time domain, and occupies 12 contiguous subcarriers in the frequency domain) | Quantity of modulated symbol groups |
|---|---|---|
| 0 | | K=10 |
| 1 | | K=20 |
| 2 | | K=30 |
| 3 | | K=60 |
| 4 | | K=22 |
| 5 | | K=66 |
| 6 | | K=32 |
| 7 | | K = 8 |
| 8 | | K = 16 |
| 9 | | K = 20 |

▓ Resource element carrying a reference signal

⊠ Resource element carrying control information

FIG. 4j

▨ Resource element carrying
a reference signal

⊠ Resource element carrying
control information

▦ Resource element carrying
a reference signal
▨ Resource element carrying
control information
FIG. 4m
▦ Resource element carrying
a reference signal
▨ Resource element carrying
control information
☐ No information is carried
FIG. 4n
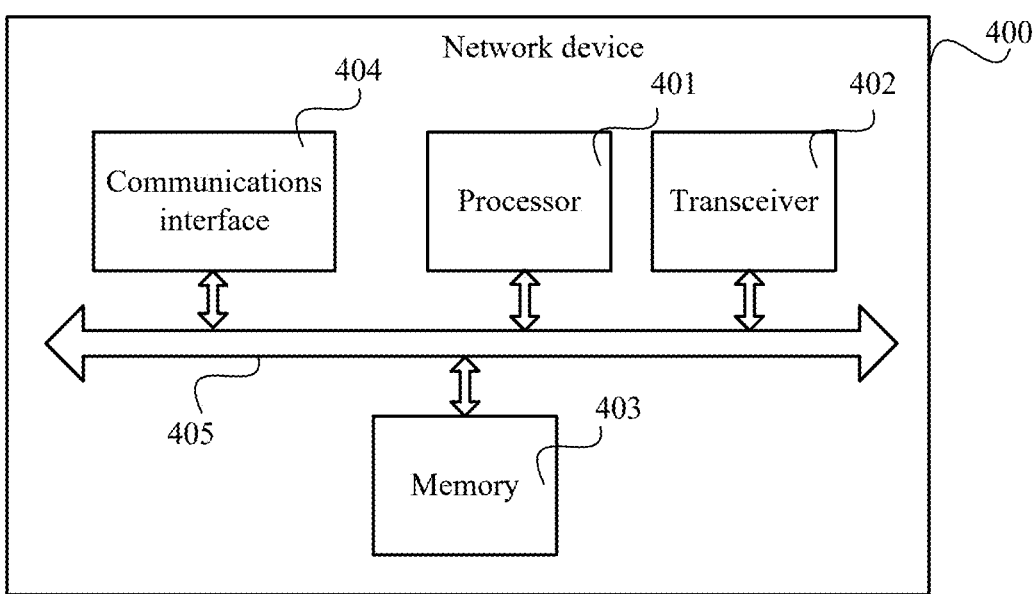
FIG. 5

CONTROL INFORMATION TRANSMISSION METHOD, RELATED APPARATUS, AND COMPUTER STORAGE MEDIUM

CROSS-REFERENCE TO RELATED APPLICATIONS

This application is a continuation of U.S. patent application Ser. No. 18/329,501, filed on Jun. 5, 2023, which is a continuation of U.S. patent application Ser. No. 17/473,665, filed on Sep. 13, 2021, now U.S. Pat. No. 11,671,986, which is a continuation of U.S. patent application No. 16/672,895, filed on Nov. 4, 2019, now U.S. Pat. No. 11,122,557, which is a continuation of International Application No. PCT/CN2018/085709, filed on May 4, 2018, which claims priority to Chinese Patent Application No. 201710309765.7, filed on May 4, 2017. All of the aforementioned patent applications are hereby incorporated by reference in their entireties.

TECHNICAL FIELD

Embodiments of this application relate to the communications field, and in particular, to a control information transmission method, a related apparatus, and a computer storage medium.

BACKGROUND

In a mobile communications system, a network device sends control information and a reference signal on a time-frequency resource in which a downlink control channel corresponding to a terminal device is located. In the prior art, a location of a time-frequency resource for the reference signal is predefined. The terminal device receives the reference signal based on the location of the time-frequency resource for the reference signal, performs channel estimation based on the received reference signal, and then demodulates the control information based on a result of channel estimation.

In the prior art, reference signals are distributed in an entire time-frequency resource area in which control information is located. FIG. 1 is an example schematic structural diagram of distributing reference signals in a time-frequency resource area in which a control channel is located in the prior art. As shown in FIG. 1, a horizontal coordinate represents time domain, a vertical coordinate represents frequency domain, and a first physical resource block 101, a second physical resource block 102, and a third physical resource block 103 are included in a frequency domain direction. Each physical resource block occupies 12 contiguous subcarriers in the frequency domain, and may occupy a plurality of contiguous symbols, for example, seven contiguous symbols, in the time domain. If a subcarrier on a first symbol is used to carry information about a control channel, regardless of whether a physical resource block corresponding to the first symbol carries control information, the physical resource block carries a reference signal. As shown in FIG. 1, the second physical resource block 102 carries no control information, but a reference signal is still sent on the second physical resource block. In the technology, reference signal density is excessively high, causing a resource waste.

To avoid the resource waste problem in the prior art shown in FIG. 1, FIG. 1a is an example schematic structural diagram of distributing reference signals in a time-frequency resource area in which a control channel is located in the prior art. As shown in FIG. 1a, because a second physical resource block 102 carries no control information, no reference signal is sent on the second physical resource block. However, due to an excessively small quantity of reference signals in a physical resource block in the technology, when channel estimation is performed based on the reference signals in the physical resource block, accuracy of a result of channel estimation is reduced.

SUMMARY

Embodiments of this application provide a control information transmission method, a related apparatus, and a computer storage medium, to improve channel estimation accuracy without increasing reference signal density.

According to a first aspect, an embodiment of this application provides a control information transmission method, including: determining configuration information of a control channel, where the configuration information includes frequency domain information and/or time domain information used to indicate a time-frequency resource occupied by the control channel, and indication information used to indicate at least one resource element set, wherein the time-frequency resource occupied by the control channel includes the at least one resource element set; mapping control information to one or more of the at least one resource element set based on the configuration information; sending the configuration information to a terminal device; and sending the control information to the terminal device.

Optionally, the indication information used to indicate the at least one resource element set includes frequency domain information and/or time domain information of the at least one resource element set.

Optionally, the indication information used to indicate the at least one resource element set includes pattern information of the at least one resource element set.

Optionally, each of the at least one resource element set includes two resource element groups, three resource element groups, or six resource element groups, where each of the resource element groups occupies one contiguous symbol in time domain, and occupies 12 contiguous subcarriers in frequency domain.

Optionally, the indication information used to indicate the at least one resource element set includes a quantity of contiguous resource element groups included in a resource element set in the time domain.

Optionally, each one of the at least one resource element set includes two resource element groups, where the two resource element groups occupy one OFDM symbol in the time domain, and occupy two contiguous resource blocks in the frequency domain.

Optionally, each one of the at least one resource element set includes six resource element groups, where the six resource element groups occupy one OFDM symbol in the time domain, and occupy six contiguous resource blocks in the frequency domain.

Optionally, each one of the at least one resource element set includes two resource element groups, where the two resource element groups occupy two contiguous OFDM symbols in the time domain, and occupy one physical resource block in the frequency domain.

Optionally, each one of the at least one resource element set includes six resource element groups, where the six resource element groups occupy two contiguous OFDM symbols in the time domain, and occupy three contiguous resource blocks in the frequency domain.

3

Optionally, each one of the at least one resource element set includes three resource element groups, where the three resource element groups occupy three contiguous OFDM symbols in the time domain, and occupy one resource block in the frequency domain.

Optionally, each one of the at least one resource element set includes six resource element groups, where the six resource element groups occupy three contiguous OFDM symbols in the time domain, and occupy two contiguous resource blocks in the frequency domain.

Optionally, the configuration information is sent to the terminal device by using higher layer signaling, and the higher layer signaling is RRC signaling or system information.

Optionally, the mapping control information to one or more of the at least one resource element set based on the configuration information includes: performing mapping based on an index of the resource element set and/or an index of a resource element group included in the resource element set.

Optionally, the index of the resource element set corresponds to a symbol and a subcarrier number of at least one resource element in the resource element set.

Optionally, the index of the resource element group corresponds to a symbol and a subcarrier number of at least one resource element in the resource element group.

Optionally, the configuration information further includes at least one of the following content: indication information of resources occupied in the time domain and the frequency domain by each resource element group included in each of the at least one resource element set; indication information of a mapping manner for the control information, where the mapping manner includes a time-first manner or a frequency-first manner; and a power ratio of control information to a reference signal in a resource element set, to which the control information is mapped, of the at least one resource element set.

Optionally, the mapping control information to one or more of the at least one resource element set based on the configuration information includes: mapping the control information and a reference signal to the one or more of the at least one resource element set based on the configuration information, where the reference signal is mapped to one or more resource elements in a resource element set including the control information.

According to a second aspect, an embodiment of this application provides a control information transmission method, including: receiving configuration information sent by a network device, where the configuration information includes frequency domain information and/or time domain information used to indicate a time-frequency resource occupied by a control channel, and indication information used to indicate at least one resource element set, wherein the time-frequency resource occupied by the control channel includes the at least one resource element set; and monitoring the control channel based on the configuration information, to obtain control information mapped to one or more of the at least one resource element set, where the control information is carried on the one or more of the at least one resource element set.

Optionally, the indication information used to indicate the at least one resource element set includes frequency domain information and/or time domain information of the at least one resource element set.

Optionally, the indication information used to indicate the at least one resource element set includes pattern information of the at least one resource element set.

4

Optionally, each of the at least one resource element set includes two resource element groups, three resource element groups, or six resource element groups, where each of the resource element groups occupies one contiguous symbol in time domain, and occupies 12 contiguous subcarriers in frequency domain.

Optionally, the indication information used to indicate the at least one resource element set includes a quantity of resource element groups included in a resource element set in the time domain.

Optionally, each one of the at least one resource element set includes two resource element groups, where the two resource element groups occupy one OFDM symbol in the time domain, and occupy two contiguous resource blocks in the frequency domain.

Optionally, each one of the at least one resource element set includes six resource element groups, where the six resource element groups occupy one OFDM symbol in the time domain, and occupy six contiguous resource blocks in the frequency domain.

Optionally, each one of the at least one resource element set includes two resource element groups, where the two resource element groups occupy two contiguous OFDM symbols in the time domain, and occupy one physical resource block in the frequency domain.

Optionally, each one of the at least one resource element set includes six resource element groups, where the six resource element groups occupy two contiguous OFDM symbols in the time domain, and occupy three contiguous resource blocks in the frequency domain.

Optionally, each one of the at least one resource element set includes three resource element groups, where the three resource element groups occupy three contiguous OFDM symbols in the time domain, and occupy one resource block in the frequency domain.

Optionally, each one of the at least one resource element set includes six resource element groups, where the six resource element groups occupy three contiguous OFDM symbols in the time domain, and occupy two contiguous resource blocks in the frequency domain.

Optionally, the configuration information is received from the network device by using higher layer signaling, and the higher layer signaling is RRC signaling or system information.

Optionally, the monitoring the control channel based on the configuration information, to obtain control information mapped to one or more of the at least one resource element set includes: monitoring the control channel of a terminal device based on the configuration information and an index of the resource element set and/or an index of a resource element group included in the resource element set, to obtain the control information mapped to the one or more of the at least one resource element set.

Optionally, the index of the resource element set corresponds to a symbol and a subcarrier number of at least one resource element in the resource element set.

Optionally, the index of the resource element group corresponds to a symbol and a subcarrier number of at least one resource element in the resource element group.

Optionally, the configuration information further includes at least one of the following content: indication information of a mapping manner for the control information, where the mapping manner includes a time-first manner or a frequency-first manner; and a power ratio of control information to a reference signal in a resource element set, to which the control information is mapped, of the at least one resource element set.

Optionally, the monitoring the control channel based on the configuration information, to obtain control information mapped to one or more of the at least one resource element set includes: monitoring the control channel based on the configuration information, to obtain the control information mapped to the one or more of the at least one resource element set, and obtain a reference signal mapped to one or more resource elements in a resource element set including the control information.

According to a third aspect, an embodiment of this application provides a communications apparatus. The apparatus may be a network device, or may be a chip in a network device. The apparatus may include a processing unit and a transceiver unit. When the apparatus is a network device, the processing unit may be a processor, and the transceiver unit may be a transceiver. The network device may further include a storage unit. The storage unit may be a memory. The storage unit is configured to store an instruction, and the processing unit executes the instruction stored in the storage unit, so that the network device performs the method in the first aspect or any implementation of the first aspect. When the apparatus is a chip in a network device, the processing unit may be a processor, and the transceiver unit may be an input/output interface, a pin, a circuit, or the like. The processing unit executes an instruction stored in a storage unit, so that the network device performs the method in the first aspect or any implementation of the first aspect. The storage unit may be a storage unit (for example, a register or a buffer) in the chip, or may be a storage unit (for example, a read-only memory or a random-access memory) in the network device and outside the chip.

According to a fourth aspect, an embodiment of this application provides a communications apparatus. The apparatus may be a terminal device, or may be a chip in a terminal device. The apparatus may include a processing unit and a transceiver unit. When the apparatus is a terminal device, the processing unit may be a processor, and the transceiver unit may be a transceiver. The terminal device may further include a storage unit. The storage unit may be a memory. The storage unit is configured to store an instruction, and the processing unit executes the instruction stored in the storage unit, so that the terminal device performs the method in the second aspect or any implementation of the second aspect. When the apparatus is a chip in a terminal device, the processing unit may be a processor, and the transceiver unit may be an input/output interface, a pin, a circuit, or the like. The processing unit executes an instruction stored in a storage unit, so that the terminal device performs the method in the second aspect or any implementation of the second aspect. The storage unit may be a storage unit (for example, a register or a buffer) in the chip, or may be a storage unit (for example, a read-only memory or a random-access memory) in the terminal device and outside the chip.

According to a fifth aspect, an embodiment of this application provides a communications apparatus, where the apparatus includes a processor and a storage medium, the storage medium stores an instruction, and when the instruction is run by the processor, the processor performs the method in the first aspect or any implementation of the first aspect. The apparatus may be a chip or a chip system.

According to a sixth aspect, an embodiment of this application provides a communications apparatus, where the apparatus includes a processor and a storage medium, the storage medium stores an instruction, and when the instruction is run by the processor, the processor performs the method in the second aspect or any implementation of the second aspect. The apparatus may be a chip or a chip system.

According to a seventh aspect, an embodiment of this application provides a computer storage medium, where the computer storage medium stores a computer executable instruction, and when the computer executable instruction is invoked by a computer, the computer performs the method in the first aspect or any implementation of the first aspect.

According to an eighth aspect, an embodiment of this application provides a computer storage medium, where the computer storage medium stores a computer executable instruction, and when the computer executable instruction is invoked by a computer, the computer performs the method in the second aspect or any implementation of the second aspect.

According to a ninth aspect, an embodiment of this application provides a computer program product, where the computer program product includes computer program code, and when the computer program code is run by a communications device, the communications device performs the method in the first aspect or any implementation of the first aspect.

According to a tenth aspect, an embodiment of this application provides a computer program product, where the computer program product includes computer program code, and when the computer program code is run by a communications device, the communications device performs the method in the second aspect or any implementation of the second aspect.

According to an eleventh aspect, an embodiment of this application provides a control information transmission method, including: determining, by a network device, configuration information of a control channel, where the configuration information includes frequency domain information and/or time domain information used to indicate a time-frequency resource occupied by the control channel, and includes indication information used to indicate at least one resource element set, wherein the time-frequency resource occupied by the control channel includes the at least one resource element set; mapping, by the network device, control information to one or more of the at least one resource element set based on the configuration information; and sending, by the network device, the configuration information to a terminal device, and sending the control information to the terminal device. That the configuration information includes frequency domain information and/or time domain information used to indicate a time-frequency resource occupied by the control channel specifically means that the configuration information may include the time domain information, or include the frequency domain information, or include the frequency domain information and the time domain information.

Because the network device maps the control information to the one or more of the at least one resource element set based on the configuration information, the terminal device can perform joint channel estimation based on all reference signals included in a resource element set. A quantity of reference signals used in channel estimation is increased, and therefore channel estimation accuracy is improved without increasing reference signal density.

Optionally, the indication information used to indicate the at least one resource element set includes frequency domain information and/or time domain information of the at least one resource element set. For example, the indication information used to indicate the at least one resource element set may specifically indicate a symbol and a subcarrier that are occupied by a resource element set. Optionally, the indication information used to indicate the at least one resource element set includes pattern information of the at least one resource element set. For example, some resource element set patterns are preset, and each pattern of resource element set occupies a fixed symbol and subcarrier. Optionally, each pattern of resource element set may have a piece of pattern information, and the pattern information is used to uniquely indicate the pattern of resource element set. For example, pattern information of a resource element set may be an identifier of the resource element set. In this way, a resource element set can be more flexibly configured for each terminal device.

Optionally, each of the at least one resource element set includes at least one resource element group, where the resource element group occupies one contiguous symbol in time domain, and occupies 12 contiguous subcarriers in frequency domain. Optionally, the indication information used to indicate the at least one resource element set includes at least one of information about a resource element group included in the at least one resource element set in the frequency domain and information about a resource element group included in the at least one resource element set in the time domain. In a first optional implementation, the indication information used to indicate the at least one resource element set includes the information about the resource element group included in the at least one resource element set in the frequency domain and the information about the resource element group included in the at least one resource element set in the time domain. In a second optional implementation, the indication information used to indicate the at least one resource element set includes the information about the resource element group included in the at least one resource element set in the frequency domain, and information about a resource element group included in a resource element set in the time domain may be preset or agreed on in another manner or the like. In a third optional implementation, the indication information used to indicate the at least one resource element set includes the information about the resource element group included in the at least one resource element set in the time domain, and information about a resource element group included in a resource element set in the frequency domain may be preset or agreed on in another manner or the like.

Optionally, each one of the at least one resource element set includes at least one of the following: the resource element set includes a first resource element group; the resource element set includes a second resource element group and a third resource element group, where the second resource element group and the third resource element group occupy a same symbol in the time domain, and occupy contiguous subcarriers in the frequency domain; the resource element set includes a fourth resource element group, a fifth resource element group, and a sixth resource element group, where the fourth resource element group, the fifth resource element group, and the sixth resource element group occupy a same symbol in the time domain, and occupy contiguous subcarriers in the frequency domain; the resource element set includes a seventh resource element group, an eighth resource element group, a ninth resource element group, a tenth resource element group, an eleventh resource element group, and a twelfth resource element group, where the seventh resource element group, the eighth resource element group, the ninth resource element group, the tenth resource element group, the eleventh resource element group, and the twelfth resource element group occupy a same symbol in the time domain, and occupy contiguous subcarriers in the frequency domain; the resource element set includes a thirteenth resource element group and a fourteenth resource element group, where the thirteenth resource element group and the fourteenth resource element group occupy contiguous symbols in the time domain, and occupy a same subcarrier in the frequency domain; the resource element set includes a fifteenth resource element group, a sixteenth resource element group, a seventeenth resource element group, an eighteenth resource element group, a nineteenth resource element group, and a twentieth resource element group, where the fifteenth resource element group, the sixteenth resource element group, and the seventeenth resource element group occupy a same symbol in the time domain, and occupy contiguous subcarriers in the frequency domain; the eighteenth resource element group, the nineteenth resource element group, and the twentieth resource element group occupy a same symbol in the time domain, and occupy contiguous subcarriers in the frequency domain; the fifteenth resource element group and the eighteenth resource element group occupy a same subcarrier in the frequency domain, and occupy contiguous symbols in the time domain; the sixteenth resource element group and the nineteenth resource element group occupy a same subcarrier in the frequency domain, and occupy contiguous symbols in the time domain; and the seventeenth resource element group and the twentieth resource element group occupy a same subcarrier in the frequency domain, and occupy contiguous symbols in the time domain; the resource element set includes a twenty-first resource element group, a twenty-second resource element group, and a twenty-third resource element group, where the twenty-first resource element group, the twenty-second resource element group, and the twenty-third resource element group occupy contiguous symbols in the time domain, and occupy a same subcarrier in the frequency domain; and the resource element set includes a twenty-fourth resource element group, a twenty-fifth resource element group, a twenty-sixth resource element group, a twenty-seventh resource element group, a twenty-eighth resource element group, and a twenty-ninth resource element group, where the twenty-fourth resource element group, the twenty-sixth resource element group, and the twenty-eighth resource element group occupy contiguous symbols in the time domain, and occupy a same subcarrier in the frequency domain; the twenty-fifth resource element group, the twenty-seventh resource element group, and the twenty-ninth resource element group occupy contiguous symbols in the time domain, and occupy a same subcarrier in the frequency domain; the twenty-fourth resource element group and the twenty-fifth resource element group occupy contiguous subcarriers in the frequency domain, and occupy a same symbol in the time domain; the twenty-sixth resource element group and the twenty-seventh resource element group occupy contiguous subcarriers in the frequency domain, and occupy a same symbol in the time domain; and the twenty-eighth resource element group and the twenty-ninth resource element group occupy contiguous subcarriers in the frequency domain, and occupy a same symbol in the time domain.

Optionally, the mapping, by the network device, control information to one or more of the at least one resource element set based on the configuration information includes: performing, by the network device, mapping based on at least one of an index of the resource element set and an index of a resource element group included in the resource element set. Optionally, the index of the resource element set corresponds to a symbol and a subcarrier number of at least one resource element in the resource element set. Optionally, the index of the resource element group corresponds to a symbol and a subcarrier number of at least one resource element in the resource element group. In this way, interleaving can be performed based on the index of the resource element group or the resource element set, so that the control information is distributed wider in the frequency domain and/or the time domain, and a larger diversity gain is obtained.

Optionally, the configuration information further includes at least one of the following content: indication information of resources occupied in the time domain and the frequency domain by each resource element group included in each of the at least one resource element set; indication information of a mapping manner for the control information, where the mapping manner includes a time-first manner or a frequency-first manner; and a power ratio of control information to a reference signal in a resource element set, to which the control information is mapped, of the at least one resource element set. In this way, the network device can more flexibly configure various information for the terminal device, so that the terminal device can more accurately perform channel estimation.

Optionally, the mapping, by the network device, control information to one or more of the at least one resource element set based on the configuration information includes: mapping, by the network device, the control information and a reference signal to the one or more of the at least one resource element set based on the configuration information, where the reference signal is mapped to one or more resource elements in a resource element set including the control information. In this way, resource wastes caused by sending of excessive reference signals can be reduced.

According to a twelfth aspect, an embodiment of this application provides a control information transmission method, including: receiving, by a terminal device, configuration information sent by a network device, where the configuration information includes frequency domain information and/or time domain information used to indicate a time-frequency resource occupied by a control channel, and includes indication information used to indicate at least one resource element set, wherein the time-frequency resource occupied by the control channel includes the at least one resource element set; and monitoring, by the terminal device, the control channel based on the configuration information, to obtain control information mapped to one or more of the at least one resource element set, where the control information is carried on the one or more of the at least one resource element set. That the configuration information includes frequency domain information and/or time domain information used to indicate a time-frequency resource occupied by the control channel specifically means that the configuration information may include the time domain information, or include the frequency domain information, or include the frequency domain information and the time domain information.

Because the network device maps the control information to the one or more of the at least one resource element set based on the configuration information, the terminal device can perform joint channel estimation based on all reference signals included in a resource element set. A quantity of reference signals used in channel estimation is increased, and therefore channel estimation accuracy is improved without increasing reference signal density.

Optionally, the indication information used to indicate the at least one resource element set includes frequency domain information and/or time domain information of the at least one resource element set. For example, the indication information used to indicate the at least one resource element set may specifically indicate a symbol and a subcarrier that are occupied by a resource element set. Optionally, the indication information used to indicate the at least one resource element set includes pattern information of the at least one resource element set. Optionally, each of the at least one resource element set includes at least one resource element group, where the resource element group occupies one contiguous symbol in time domain, and occupies 12 contiguous subcarriers in frequency domain. For example, some resource element set patterns are preset, and each pattern of resource element set occupies a fixed symbol and subcarrier. Optionally, each pattern of resource element set may have a piece of pattern information, and the pattern information is used to uniquely indicate the pattern of resource element set. For example, pattern information of a resource element set may be an identifier of the resource element set. In this way, a resource element set can be more flexibly configured for each terminal device.

Optionally, the indication information used to indicate the at least one resource element set includes at least one of information about a resource element group included in the at least one resource element set in the frequency domain and information about a resource element group included in the at least one resource element set in the time domain. In a first optional implementation, the indication information used to indicate the at least one resource element set includes the information about the resource element group included in the at least one resource element set in the frequency domain and the information about the resource element group included in the at least one resource element set in the time domain. In a second optional implementation, the indication information used to indicate the at least one resource element set includes the information about the resource element group included in the at least one resource element set in the frequency domain, and information about a resource element group included in a resource element set in the time domain may be preset or agreed on in another manner or the like. In a third optional implementation, the indication information used to indicate the at least one resource element set includes the information about the resource element group included in the at least one resource element set in the time domain, and information about a resource element group included in a resource element set in the frequency domain may be preset or agreed on in another manner or the like.

Optionally, a structure pattern of each one of the at least one resource element set is similar to that in the first aspect, and details are not described herein again.

Optionally, if the control information is mapped by the network device based on an index of the resource element set and an index of a resource element group included in the resource element set, the monitoring, by the terminal device, the control channel based on the configuration information, to obtain control information mapped to one or more of the at least one resource element set includes: monitoring, by the terminal device, the control channel of the terminal device based on the configuration information, the index of the resource element set, and the index of the resource element group included in the resource element set, to obtain the control information mapped to the one or more of the at least one resource element set. If the control information is mapped by the network device based on an index of the resource element set, the monitoring, by the terminal device, the control channel based on the configuration information, to obtain control information mapped to one or more of the at least one resource element set includes: monitoring, by the terminal device, the control channel of the terminal device based on the configuration information and the index of the resource element set, to obtain the control information mapped to the one or more of the at least one resource element set. If the control information is mapped by the network device based on an index of a resource element group included in the resource element set, the monitoring, by the terminal device, the control channel based on the configuration information, to obtain control information mapped to one or more of the at least one resource element set includes: monitoring, by the terminal device, the control channel of the terminal device based on the configuration information and the index of the resource element group included in the resource element set, to obtain the control information mapped to the one or more of the at least one resource element set.

Optionally, the index of the resource element set corresponds to a symbol and a subcarrier number of at least one resource element in the resource element set. Optionally, the index of the resource element group corresponds to a symbol and a subcarrier number of at least one resource element in the resource element group. In this way, interleaving can be performed based on the index of the resource element group or the resource element set, so that the control information is distributed wider in the frequency domain and/or the time domain, and a larger diversity gain is obtained.

Optionally, the configuration information further includes at least one of the following content: indication information of a mapping manner for the control information, where the mapping manner includes a time-first manner or a frequency-first manner; and a power ratio of control information to a reference signal in a resource element set, to which the control information is mapped, of the at least one resource element set. In this way, the network device can more flexibly configure various information for the terminal device, so that the terminal device can more accurately perform channel estimation.

Optionally, the monitoring, by the terminal device, the control channel based on the configuration information, to obtain control information mapped to one or more of the at least one resource element set includes: monitoring, by the terminal device, the control channel based on the configuration information, to obtain the control information mapped to the one or more of the at least one resource element set, and obtain a reference signal mapped to one or more resource elements in a resource element set including the control information. In this way, resource wastes caused by sending of excessive reference signals can be reduced.

According to a thirteenth aspect, an embodiment of this application provides a network device, where the network device includes a memory, a transceiver, and a processor, where the memory is configured to store an instruction, the processor is configured to execute the instruction stored in the memory, and control the transceiver to receive and send signals, and when the processor executes the instruction stored in the memory, the network device is configured to perform the method in the eleventh aspect or any implementation of the eleventh aspect.

According to a fourteenth aspect, an embodiment of this application provides a terminal device, where the terminal device includes a memory, a transceiver, and a processor, where the memory is configured to store an instruction, the processor is configured to execute the instruction stored in the memory, and control the transceiver to receive and send signals, and when the processor executes the instruction stored in the memory, the terminal device is configured to perform the method in the twelfth aspect or any implementation of the twelfth aspect.

According to a fifteenth aspect, an embodiment of this application provides a network device, configured to implement the method in the eleventh aspect or any implementation of the eleventh aspect, and including corresponding function modules respectively configured to implement steps in the method.

According to a sixteenth aspect, an embodiment of this application provides a terminal device, configured to implement the method in the twelfth aspect or any implementation of the twelfth aspect, and including corresponding function modules respectively configured to implement steps in the method.

According to a seventeenth aspect, an embodiment of this application provides a computer storage medium, where the computer storage medium stores an instruction, and when the instruction runs on a computer, the computer performs the method in the eleventh aspect or any implementation of the eleventh aspect.

According to an eighteenth aspect, an embodiment of this application provides a computer storage medium, where the computer storage medium stores an instruction, and when the instruction runs on a computer, the computer performs the method in the twelfth aspect or any implementation of the twelfth aspect.

According to a nineteenth aspect, an embodiment of this application provides a computer program product including an instruction, where when the instruction runs on a computer, the computer performs the method in the eleventh aspect or any implementation of the eleventh aspect.

According to a twentieth aspect, an embodiment of this application provides a computer program product including an instruction, where when the instruction runs on a computer, the computer performs the method in the twelfth aspect or any implementation of the twelfth aspect.

In the embodiments of this application, the network device determines the configuration information of the control channel, where the configuration information includes at least one of the frequency domain information and the time domain information used to indicate the time-frequency resource occupied by the control channel, and includes the indication information used to indicate the at least one resource element set, wherein the time-frequency resource occupied by the control channel includes the at least one resource element set; the network device maps the control information to the one or more of the at least one resource element set based on the configuration information; and the network device sends the configuration information to the terminal device, and sends the control information to the terminal device. Because the network device maps the control information to the one or more of the at least one resource element set based on the configuration information, the terminal device can perform joint channel estimation based on all reference signals included in a resource element set. A quantity of reference signals used in channel estimation is increased, and therefore channel estimation accuracy is improved without increasing reference signal density.

BRIEF DESCRIPTION OF DRAWINGS

FIG. 4*i* is a schematic structural diagram of a resource element according to an embodiment of this application;

FIG. 4*j* is schematic structural diagrams of resource element sets according to an embodiment of this application;

FIG. 4*m* is a schematic structural diagram of mapping a reference signal and control information of a dual-antenna port to a resource element group according to an embodiment of this application;

FIG. 4*n* is a schematic structural diagram of mapping a reference signal and control information of another dual-antenna port to a resource element group according to an embodiment of this application;

FIG. 5 is a schematic structural diagram of a network device for transmitting control information according to an embodiment of this application;

DESCRIPTION OF EMBODIMENTS

Technical solutions of embodiments of this application may be applied to various communications systems, for example, wireless fidelity (Wi-Fi), Worldwide Interoperability for Microwave Access (WiMAX), a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, a Long Term Evolution Advanced (LTE-A) system, a Universal Mobile Telecommunications System (UMTS), a cellular system and the like related to the $3^{rd}$ Generation Partnership Project (3GPP), and a fifth generation (5G) mobile communications system. This is not limited in the embodiments of this application.

Figure 1:
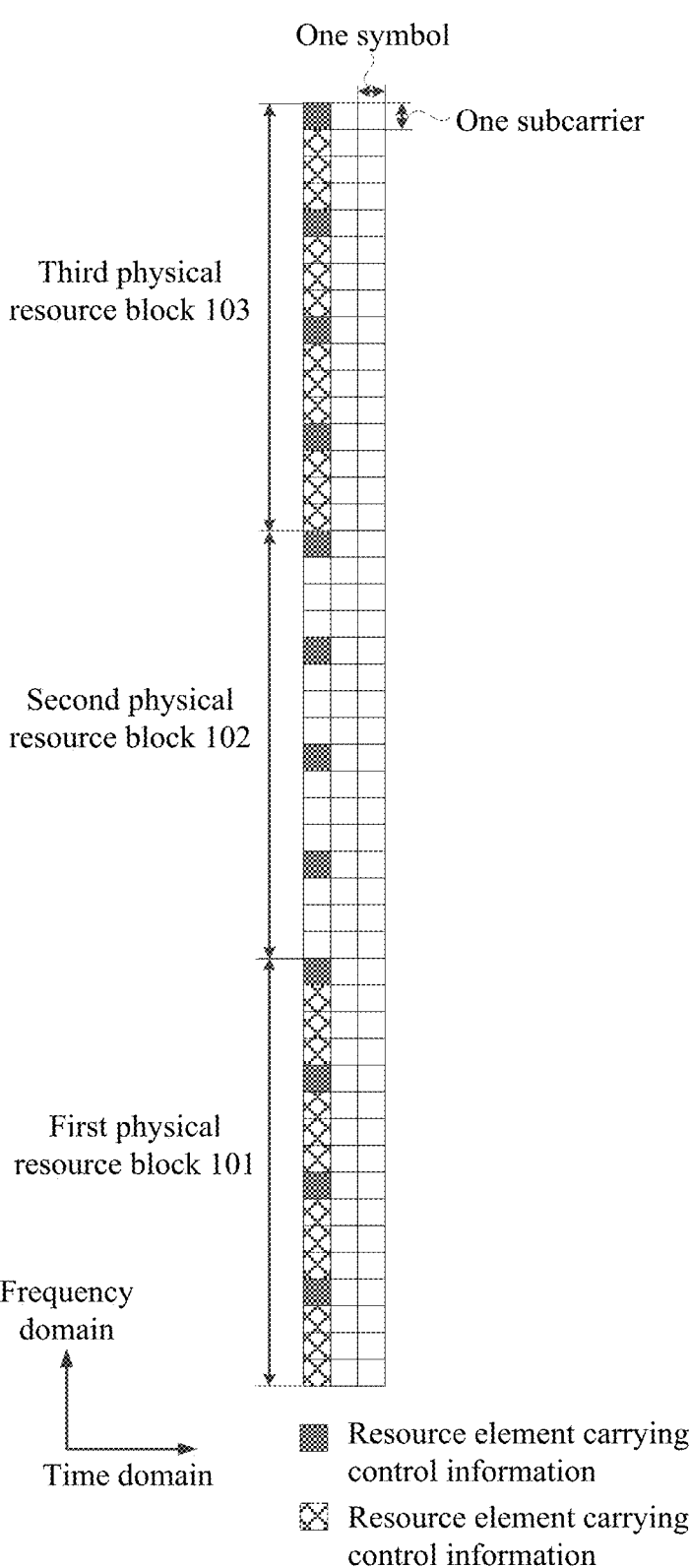
FIG. 1 is a schematic structural diagram of distributing reference signals in a time-frequency resource area in which a control channel is located in the prior art.
Figure 1A:
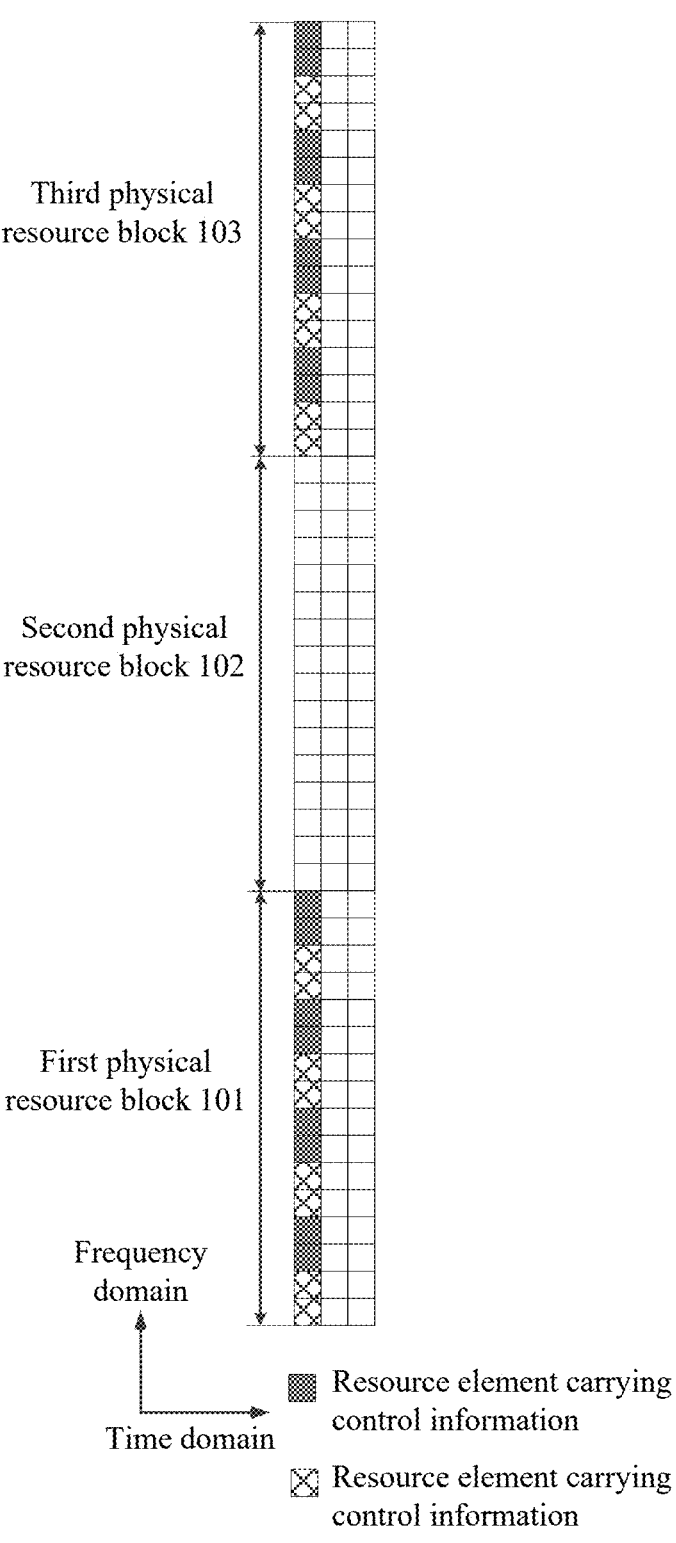
FIG. 1a is another schematic structural diagram of distributing reference signals in a time-frequency resource area in which a control channel is located in the prior art.
Figure 2:
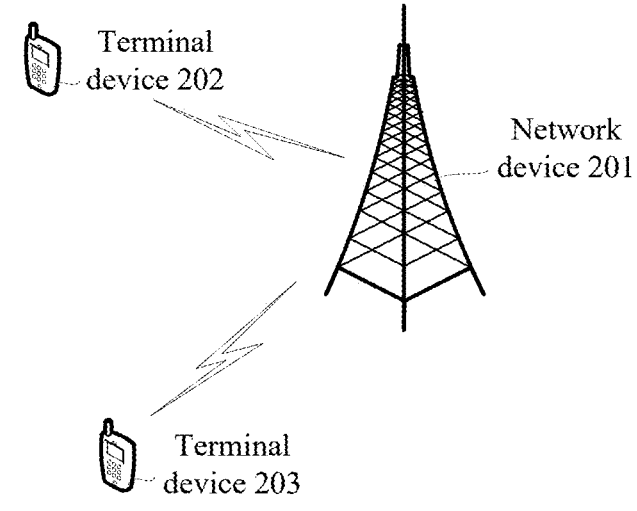
FIG. 2 is a schematic diagram of a system architecture to which an embodiment of this application is applicable.

FIG. 2 is an example schematic diagram of a system architecture to which an embodiment of this application is applicable. As shown in FIG. 2, the system architecture includes a network device 201 and a plurality of terminal devices, for example, a terminal device 202 and a terminal device 203, capable of accessing a network by using the network device 201.

The terminal device (User Equipment (UE)) in this embodiment of this application may also be referred to as a terminal, which is a device that provides voice and/or data connectivity for a user, for example, a handheld device or an in-vehicle device having a wireless connection function. Common terminals include, for example, a mobile phone, a tablet computer, a notebook computer, a palmtop computer, a mobile Internet device (MID), a wearable device such as a smartwatch, a smart band, and a pedometer, and the like.

The network device in this embodiment of this application may be a common base station (for example, a NodeB or an eNB), a new radio controller (NR controller), a centralized unit, a new radio base station, a remote radio frequency module, a micro base station, a relay, a distributed unit, a reception point (RP) or a transmission point (TP), or any other radio access device. This embodiment of this application is not limited thereto.

Figure 2A:
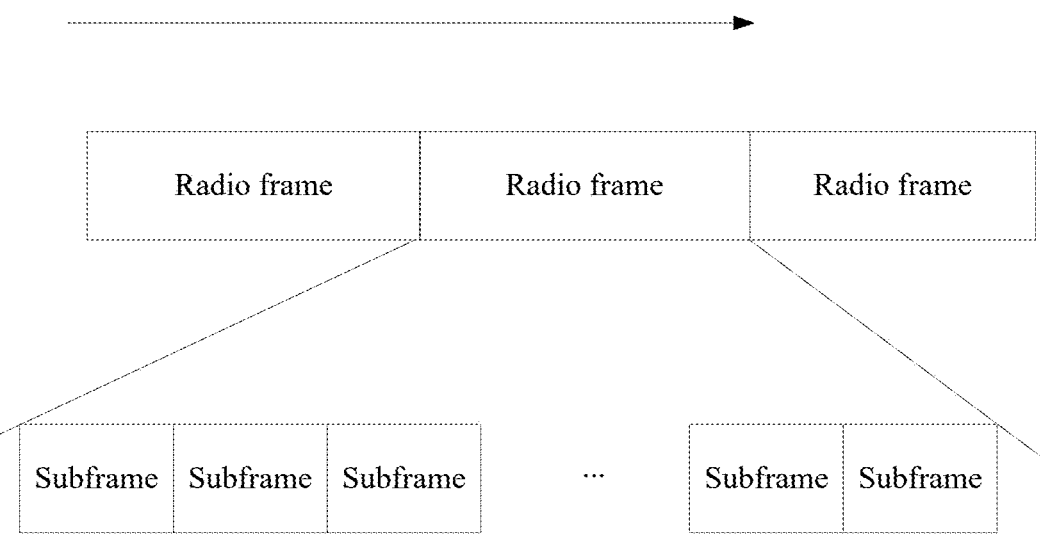
FIG. 2*a* is a schematic structural diagram of a radio frame transmitted between a network device and a terminal according to an embodiment of this application.
Figure 2B:
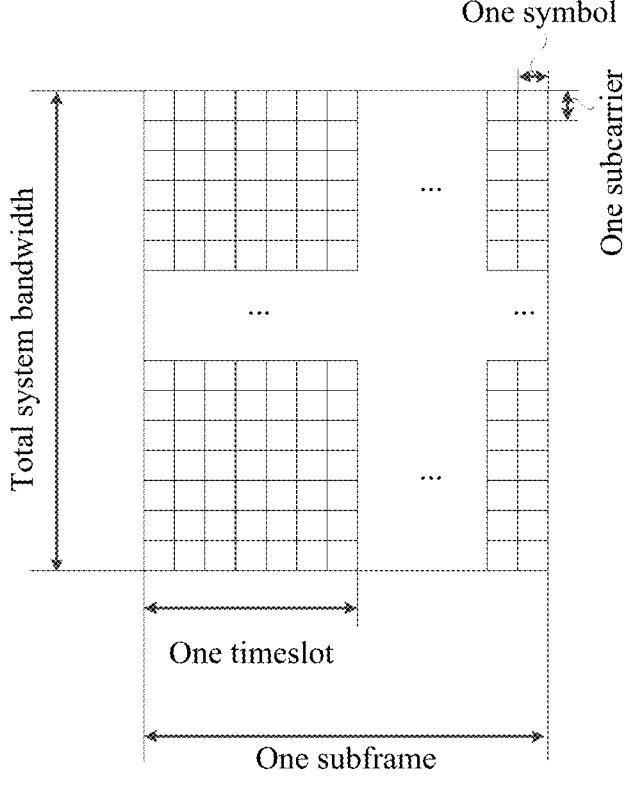
FIG. 2*b* is a schematic structural diagram of a subframe transmitted between a network device and a terminal according to an embodiment of this application.

FIG. 2*a* is an example schematic structural diagram of a radio frame transmitted between a network device and a terminal according to an embodiment of this application. As shown in FIG. 2*a*, one or more radio frames are transmitted between a network device and a terminal device by using time as a coordinate. Each radio frame may include one or more subframes. FIG. 2*b* is an example schematic structural diagram of a subframe transmitted between a network device and a terminal according to an embodiment of this application. As shown in FIG. 2*b*, one subframe may include one or more timeslots. A time-frequency resource corresponding to the terminal occupies one symbol in time domain, and occupies one subcarrier in frequency domain.

A subframe in this embodiment of this application occupies a time-frequency resource of total system bandwidth in the frequency domain, and is a time-frequency resource element with a fixed time length in the time domain. A plurality of symbols may be occupied in one subframe. Symbols occupied by one subframe may be determined depending on an actual case, and are not limited herein. For example, in LTE, one subframe occupies 14 contiguous symbols in the time domain. Alternatively, in a 5G system, when a subcarrier width is 30 kHz/60 kHz (kHz is short for kilohertz), a subframe occupies 28 or 56 contiguous symbols in the time domain.

The timeslot in this embodiment of this application is a basic time-frequency resource element. In this embodiment of this application, one timeslot may occupy seven contiguous symbols in the time domain.

The symbol in this embodiment of this application includes, but is not limited to, an orthogonal frequency division multiplexing (OFDM) symbol, a sparse code multiple access (SCMA) symbol, a filtered orthogonal frequency division multiplexing (F-OFDM) symbol, and a non-orthogonal multiple access (NOMA) symbol. A specific symbol may be determined depending on an actual case, and details are not further described herein.

A subcarrier in this embodiment of this application is a minimum granularity in the frequency domain. For example, in LTE, one subcarrier has a subcarrier width of 15 kHz; in 5G, a subcarrier may have a width of 15 kHz, 30 kHz, or 60 KHz.

A physical resource block in this embodiment of this application occupies P contiguous subcarriers in the frequency domain, and occupies Q contiguous OFDM symbols in the time domain, where P and Q are natural numbers greater than 1. For example, a unit time-frequency resource may occupy 12 contiguous subcarriers in the frequency domain, and may occupy seven contiguous OFDM symbols in the time domain, where P=12 and Q=7, or P=12 and Q=14.

A resource element group in this embodiment of this application may occupy S contiguous subcarriers in the frequency domain, and occupy T contiguous OFDM symbols in the time domain, where S is a natural number greater than 1. For example, a resource element group may occupy 12 contiguous subcarriers in the frequency domain, and may occupy one OFDM symbol in the time domain, where S=12 and T=1.

One control channel element (CCE) in this embodiment of this application may correspondingly include a plurality of resource element groups, and a quantity of resource element groups corresponding to one control channel element may be fixed, for example, 4 or 6.

Figures 3, 4A:
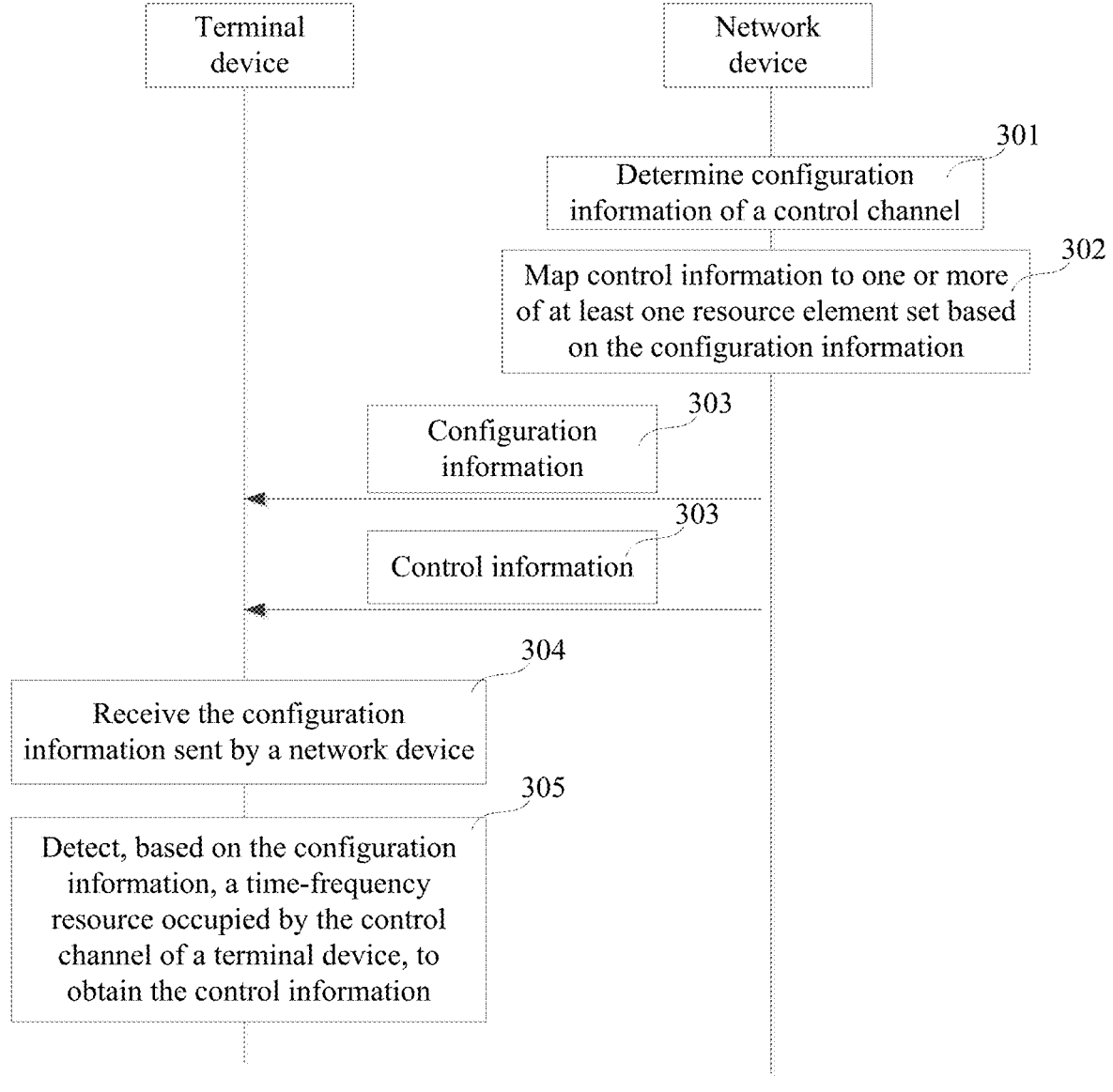
FIG. 3 is a schematic flowchart of a control information transmission method according to an embodiment of this application.
FIG. 4*a* is a schematic structural diagram of a resource element group included in a resource element set according to an embodiment of this application.

Based on the foregoing content, FIG. 3 is an example schematic flowchart of a control information transmission method according to an embodiment of this application.

Step 301: A network device determines configuration information of a control channel, where the configuration information includes frequency domain information and/or time domain information used to indicate a time-frequency resource occupied by the control channel, and includes indication information used to indicate at least one resource element set, wherein the time-frequency resource occupied by the control channel includes the at least one resource element set.

Optionally, if the configuration information includes the frequency domain information used to indicate the time-frequency resource occupied by the control channel, the time domain information of the time-frequency resource occupied by the control channel may be preset, or may be agreed on in another manner. Optionally, if the configuration information includes the time domain information used to indicate the time-frequency resource occupied by the control channel, the frequency domain information of the time-frequency resource occupied by the control channel may be preset, or may be agreed on in another manner.

For example, the configuration information includes indication information of a resource granularity occupied by the control channel in frequency domain, and indication information of a location of the control channel in the frequency domain. The time domain information may be predefined as one or two OFDM symbols.

For example, the indication information of a resource granularity indicates that a granularity of an occupied frequency domain resource is six physical resource blocks, and the indication information of a location uses a bitmap for indication. If system bandwidth includes 96 physical resource blocks in the frequency domain, every six physical resource blocks are grouped to form a group, and the system bandwidth includes 16 minimum resource granularities. The bitmap includes a bit sequence whose length is equal to the quantity of the minimum resource granularities, that is, includes a 16-bit-long bit sequence that indicates the location of the control channel in the frequency domain. If the bitmap is {0 0 0 0 1 1 1 1 0 0 0 0 0 0 0 0}, the fifth, sixth, seventh, and eighth six contiguous physical resource blocks in the system bandwidth are used to transmit the control channel, and the control channel includes 24 contiguous physical resource blocks in the frequency domain.

Optionally, physical resource blocks included in the control channel in the frequency domain are not contiguous. For example, if the bitmap is {0 0 0 0 1 0 1 0 1 0 1 0 0 0 0 0}, the fifth, seventh, ninth, and eleventh six contiguous physical resource blocks in the system bandwidth are used to transmit the control channel, and the control channel includes 24 discrete physical resource blocks in the frequency domain.

Configuration of the frequency domain information of the control channel in this embodiment of the present invention is not limited to the foregoing examples. The foregoing examples are merely examples for understanding the present invention. All configuration information falls within the protection scope of the present invention, provided that the configuration information includes a frequency domain resource size or a frequency domain resource location. Details are not further described herein.

Optionally, the network device may configure, for a terminal device based on some attribute information of the terminal device, location information of the terminal device, a service initiated by the terminal device, a current load status of a network, or time-frequency resource usage or the like, at least one of the frequency domain information and the time domain information of the time-frequency resource of the control channel.

For example, the configuration information includes a size of a resource occupied by the control channel in the time domain, including one or two OFDM symbols. Alternatively, the configuration information further includes location information of the resource occupied in the time domain. For example, the configuration information indicates that an OFDM symbol on which the control channel is located is a zeroth OFDM symbol, a first OFDM symbol, or the like. A frequency domain location of the control channel is predefined in the frequency domain. For example, using a central subcarrier of system bandwidth as a center, 96 physical resource blocks are symmetrically included in the frequency domain, or bandwidth in the frequency domain is 5 MHz. A specific value of the bandwidth is not limited.

Alternatively, the configuration information includes a location of a timeslot in which the control channel is located in a given time domain period. For example, a predefined or configurable period includes 10 timeslots, and the location of the timeslot in which the control channel is located is indicated by using a bitmap. The bitmap has a bit length equal to a quantity of timeslots included in one period. If the bitmap is {1 0 0 0 0 1 0 0 0 0}, the control channel is included in the first and sixth timeslots in the time domain.

In addition to bitmap-based indication, a location at which the control channel appears in the time domain may be predefined as {first timeslot, sixth timeslot}, {third timeslot, seventh timeslot}, or {first timeslot}. An identifier may be a bit sequence. For example, {00} corresponds to the locations {first timeslot, sixth timeslot} at which the control channel appears in the time domain, {01} corresponds to the locations {third timeslot, seventh timeslot} at which the control channel appears in the time domain, and {10} corresponds to the location {first timeslot} at which the control channel appears in the time domain. A time domain indication method is not limited herein, where a bitmap may be used, or an identifier indicates a predefined time domain location, which all fall within the protection scope of the present invention.

Optionally, if the configuration information includes the frequency domain information and the time domain information used to indicate the time-frequency resource occupied by the control channel, the time domain information may be a location and/or a size of an OFDM symbol in a specified timeslot, and the frequency domain information may be a quantity or locations of physical resource blocks in the frequency domain.

Optionally, in this embodiment of this application, the network device may further configure, for the terminal device based on the some attribute information of the terminal device, the location information of the terminal device, the service initiated by the terminal device, the current load status of the network, or the time-frequency resource usage or the like, indication information of at least one resource element set corresponding to the network device.

Optionally, the network device may send the configuration information to the terminal device by using higher layer signaling, for example, radio resource control (RRC) signaling or system information. Optionally, at least one of the frequency domain information and the time domain information of the time-frequency resource occupied by the control channel in step 301 may be transmitted by using broadcast signaling sent on a broadcast channel.

Step 302: The network device maps the control information to one or more of the at least one resource element set based on the configuration information.

Step 303: The network device sends the configuration information to a terminal device, and sends the control information to the terminal device. Optionally, an order of sending the configuration information and sending the control information by the network device is not limited. The network device may first send the configuration information or may first send the control information.

Optionally, after step 303, step 304 may be performed: The terminal device receives the configuration information sent by the network device.

Step 305: The terminal device monitors the control channel based on the configuration information, to obtain the control information mapped to the one or more of the at least one resource element set, where the control information is carried on the one or more of the at least one resource element set.

Optionally, in step 305, specifically, the terminal device performs joint channel estimation based on all reference signals included in a resource element set, and obtains, based on a result of channel estimation, control information mapped to the resource element set. In this way, reference signal density is not increased, and because a quantity of reference signals used in channel estimation is increased, channel estimation accuracy is improved.

Optionally, the indication information used to indicate the at least one resource element set includes frequency domain information and/or time domain information of the at least one resource element set.

For example, the indication information used to indicate the at least one resource element set may specifically indicate a symbol and a subcarrier that are occupied by a resource element set. A typical value may be as follows: a quantity of symbols included in the time domain is 1, 2, or 3; or a quantity of subcarriers included in the frequency domain is 12, 24, 48, or 72.

For example, the indication information used to indicate the at least one resource element set may specifically indicate a quantity of contiguous symbols occupied by a resource element set in the time domain. A typical value may be as follows: a quantity of symbols included in the time domain may be 1, 2, or 3.

For example, the indication information used to indicate the at least one resource element set may specifically indicate a quantity of contiguous subcarriers occupied by a resource element set in the frequency domain. A typical value may be as follows: a quantity of subcarriers is 12, 24, 48, or 72. Alternatively, a quantity of contiguous physical resource blocks occupied in the frequency domain is indicated; and a typical value may be 2, 3, or 6.

Optionally, the indication information used to indicate the at least one resource element set further includes resource information of a reference signal that is included in the at least one resource element set and that is used for channel estimation, for example, a quantity of ports for the reference signal used for channel estimation, where at least one of the antenna ports corresponds to a predefined group of resource elements, and the resource elements are used to send the reference signal.

The quantity of antenna ports may be 1 or 2. If the quantity of antenna ports is 1, a reference signal location in each resource element group in the resource element set corresponds to a resource element set pattern {0} in FIG. 4j. If the quantity of antenna ports is 2, a reference signal location in each resource element group in the resource element set corresponds to a resource element set pattern {7} in FIG. 4j.

In this embodiment of the present invention, information indicating a location of a resource element for sending a reference signal is not limited to the foregoing examples. The foregoing examples in which indication is performed by using a quantity of antenna ports are merely examples for understanding the present invention. All configuration information falls within the protection scope of the present invention, provided that the configuration information indicates a quantity or locations of resource elements that are in a resource element set and that are used to transmit a reference signal. Details are not further described herein.

In another optional implementation, the indication information used to indicate the at least one resource element set includes pattern information of the at least one resource element set. For example, some resource element set patterns are preset, and each pattern of resource element set occupies a fixed symbol and subcarrier. Optionally, each pattern of resource element set may have a piece of pattern information, and the pattern information is used to uniquely indicate the pattern of resource element set. For example, pattern information of a resource element set may be an identifier of the resource element set.

Optionally, each of the at least one resource element set in this embodiment of this application includes at least one resource element group. Optionally, the resource element group occupies one contiguous symbol in the time domain, and occupies 12 contiguous subcarriers in the frequency domain. Optionally, the symbol may be an OFDM symbol.

Optionally, the indication information used to indicate the at least one resource element set may alternatively be indication information indicating a resource element group included in the resource element set.

In a first optional implementation, the indication information used to indicate the at least one resource element set includes information about a resource element group included in the at least one resource element set in the frequency domain and information about a resource element group included in the at least one resource element set in the time domain. For example, in the time domain, the indication information includes a quantity of contiguous resource element groups in the time domain, and in the frequency domain, the indication information includes a quantity of contiguous resource element groups in the frequency domain.

In a second optional implementation, the indication information used to indicate the at least one resource element set includes information about a resource element group included in the at least one resource element set in the frequency domain. For example, in the frequency domain, the indication information includes a quantity of contiguous resource element groups in the frequency domain. Information about a resource element group included in a resource element set in the time domain may be preset or agreed on in another manner or the like.

In a third optional implementation, the indication information used to indicate the at least one resource element set includes information about a resource element group included in the at least one resource element set in the time domain. For example, in the time domain, the indication information includes a quantity of contiguous resource element groups in the time domain. Information about a resource element group included in a resource element set in the frequency domain may be preset or agreed on in another manner or the like.

In a fourth optional implementation, one or more resource element set patterns are predefined, and the indication information indicates one of the one or more resource element set patterns.

In this embodiment of this application, FIG. 4a to FIG. 4h are example schematic structural diagrams of a resource element group included in a resource element set according to an embodiment of this application. In a first resource element group, a second resource element group, . . . , and a twenty-eighth resource element group in this embodiment of this application, the "first", "second", . . . , and "twenty-eighth" are merely intended to distinguish resource element groups, and are not limitative. In this embodiment of this application, one resource element group occupies one or more contiguous time domain symbols in the time domain, and occupies one or more contiguous subcarriers in the frequency domain.

As shown in FIG. 4a, the resource element set includes a first resource element group.

Figure 4B:
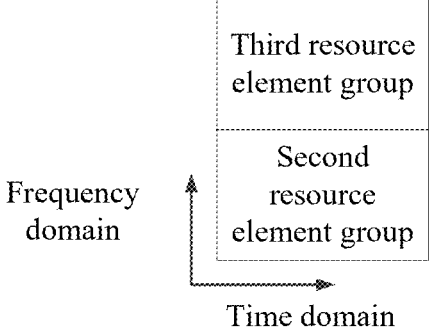
FIG. 4*b* is a schematic structural diagram of a resource element group included in another resource element set according to an embodiment of this application.

As shown in FIG. 4b, the resource element set includes a second resource element group and a third resource element group, where the second resource element group and the third resource element group occupy a same symbol in the time domain, and occupy contiguous subcarriers in the frequency domain. Optionally, the second resource element group and the third resource element group may occupy a same quantity or different quantities of subcarriers.

Figure 4C:
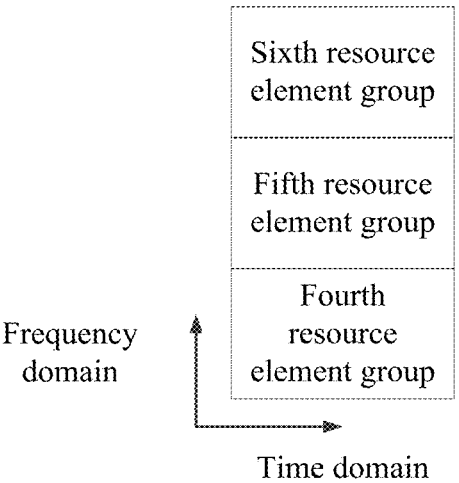
FIG. 4*c* is a schematic structural diagram of a resource element group included in another resource element set according to an embodiment of this application.

As shown in FIG. 4c, the resource element set includes a fourth resource element group, a fifth resource element group, and a sixth resource element group, where the fourth resource element group, the fifth resource element group, and the sixth resource element group occupy a same symbol in the time domain, and occupy contiguous subcarriers in the frequency domain. Optionally, any two of the fourth resource element group, the fifth resource element group, and the sixth resource element group may occupy a same quantity or different quantities of subcarriers.

Figures 4D, 4E:
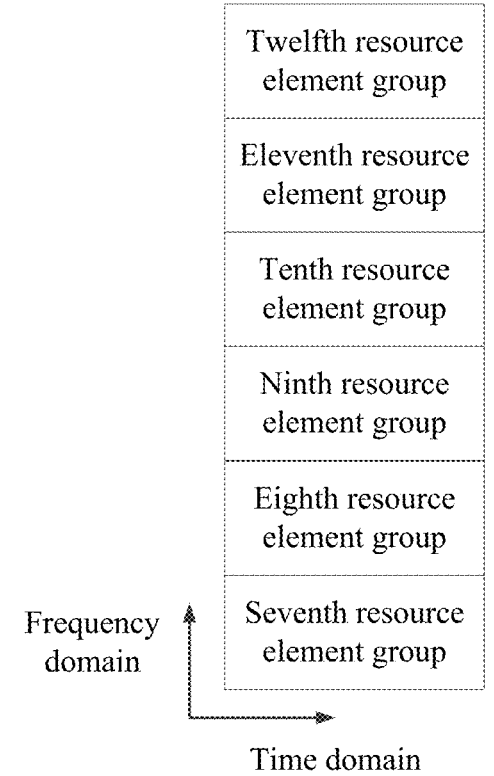
FIG. 4*d* is a schematic structural diagram of a resource element group included in another resource element set according to an embodiment of this application.
FIG. 4*e* is a schematic structural diagram of a resource element group included in another resource element set according to an embodiment of this application.

As shown in FIG. 4d, the resource element set includes a seventh resource element group, an eighth resource element group, a ninth resource element group, a tenth resource element group, an eleventh resource element group, and a twelfth resource element group, where the seventh resource element group, the eighth resource element group, the ninth resource element group, the tenth resource element group, the eleventh resource element group, and the twelfth resource element group occupy a same symbol in the time domain, and occupy contiguous subcarriers in the frequency domain. Optionally, any two of the seventh resource element group, the eighth resource element group, the ninth resource element group, the tenth resource element group, the eleventh resource element group, and the twelfth resource element group may occupy a same quantity or different quantities of subcarriers.

As shown in FIG. 4e, the resource element set includes a thirteenth resource element group and a fourteenth resource element group, where the thirteenth resource element group and the fourteenth resource element group occupy contiguous symbols in the time domain, and occupy a same subcarrier in the frequency domain. Optionally, thirteenth resource element group and the fourteenth resource element group may occupy a same quantity or different quantities of symbols.

Figure 4F:
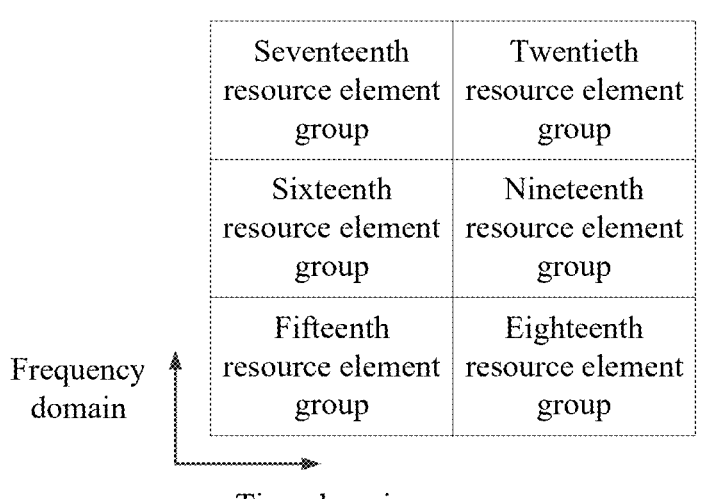
FIG. 4*f* is a schematic structural diagram of a resource element group included in another resource element set according to an embodiment of this application.

As shown in FIG. 4f, the resource element set includes a fifteenth resource element group, a sixteenth resource element group, a seventeenth resource element group, an eighteenth resource element group, a nineteenth resource element group, and a twentieth resource element group, where the fifteenth resource element group, the sixteenth resource element group, and the seventeenth resource element group occupy a same symbol in the time domain, and occupy contiguous subcarriers in the frequency domain; the eighteenth resource element group, the nineteenth resource element group, and the twentieth resource element group occupy a same symbol in the time domain, and occupy contiguous subcarriers in the frequency domain; the fifteenth resource element group and the eighteenth resource element group occupy a same subcarrier in the frequency domain, and occupy contiguous symbols in the time domain; the sixteenth resource element group and the nineteenth resource element group occupy a same subcarrier in the frequency domain, and occupy contiguous symbols in the time domain; and the seventeenth resource element group and the twentieth resource element group occupy a same subcarrier in the frequency domain, and occupy contiguous symbols in the time domain. Optionally, two resource element groups occupying contiguous symbols in the time domain may occupy a same quantity or different quantities of subcarriers, and two resource element groups occupying contiguous symbols in the frequency domain may occupy a same quantity or different quantities of symbols.

Figure 4G:
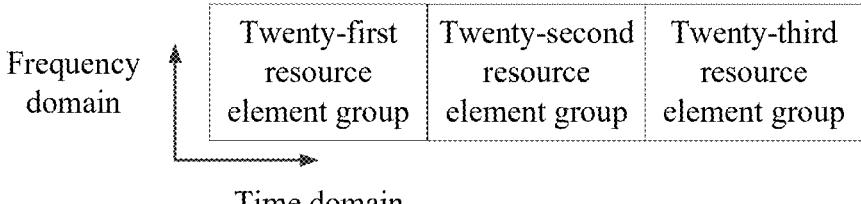
FIG. 4*g* is a schematic structural diagram of a resource element group included in another resource element set according to an embodiment of this application.

As shown in FIG. 4g, the resource element set includes a twenty-first resource element group, a twenty-second resource element group, and a twenty-third resource element group, where the twenty-first resource element group, the twenty-second resource element group, and the twenty-third resource element group occupy contiguous symbols in the time domain, and occupy a same subcarrier in the frequency domain. Optionally, two resource element groups occupying contiguous symbols in the time domain may occupy a same quantity or different quantities of subcarriers, and two resource element groups occupying contiguous symbols in the frequency domain may occupy a same quantity or different quantities of symbols.

Figure 4H:
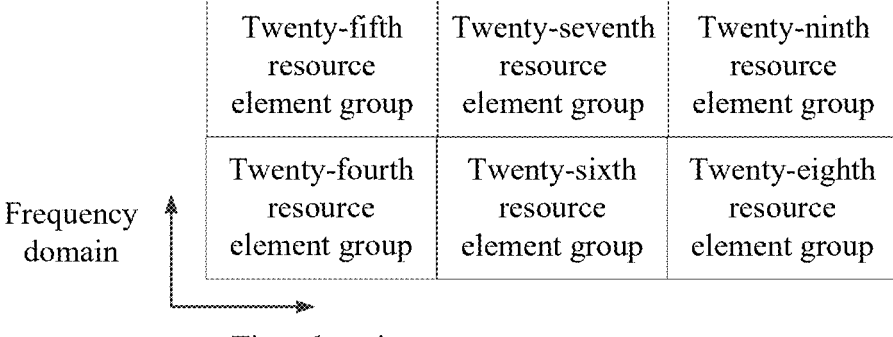
FIG. 4*h* is a schematic structural diagram of a resource element group included in another resource element set according to an embodiment of this application.

As shown in FIG. 4h, the resource element set includes a twenty-fourth resource element group, a twenty-fifth resource element group, a twenty-sixth resource element group, a twenty-seventh resource element group, a twenty-eighth resource element group, and a twenty-ninth resource element group, where the twenty-fourth resource element group, the twenty-sixth resource element group, and the twenty-eighth resource element group occupy contiguous symbols in the time domain, and occupy a same subcarrier in the frequency domain; the twenty-fifth resource element group, the twenty-seventh resource element group, and the twenty-ninth resource element group occupy contiguous symbols in the time domain, and occupy a same subcarrier in the frequency domain; the twenty-fourth resource element group and the twenty-fifth resource element group occupy contiguous subcarriers in the frequency domain, and occupy a same symbol in the time domain; the twenty-sixth resource element group and the twenty-seventh resource element group occupy contiguous subcarriers in the frequency domain, and occupy a same symbol in the time domain; and the twenty-eighth resource element group and the twenty-ninth resource element group occupy contiguous subcarriers in the frequency domain, and occupy a same symbol in the time domain. Optionally, two resource element groups occupying contiguous symbols in the time domain may occupy a same quantity or different quantities of subcarriers, and two resource element groups occupying contiguous symbols in the frequency domain may occupy a same quantity or different quantities of symbols.

This embodiment of this application describes, for example, the foregoing possible forms of a resource element group included in a resource element set. When a quantity of resource element groups included in the resource element set is increased in the time domain, a frequency diversity gain obtained by a control channel carried on the resource element groups increases. Therefore, an additional time domain diversity gain is obtained, and a coverage capability of the control channel is enhanced.

During specific implementation, in different service scenarios, the control channel changes differently in the time domain and the frequency domain, and quantities of resource element groups included in a resource element set in the time domain and the frequency domain are also different. Therefore, a time-frequency resource size of a resource element group in the resource element set may be further designed, to further enhance the coverage capability of the control channel.

Optionally, in this embodiment of this application, an index is set for each resource element group. The index may also be referred to as an identifier, and may uniquely determine the resource element group. The index of the resource element group corresponds to a symbol and a subcarrier number of at least one resource element in the resource element group. For example, a symbol and a subcarrier number of a resource element in the resource element group are directly used as the index of the resource element group. In this case, the index of the resource element group includes two values. Optionally, a symbol and a subcarrier number of a resource element occupying a minimum symbol in the resource element group may be directly used as the index of the resource element group, or a symbol and a subcarrier number of a resource element occupying a minimum subcarrier in the resource element group may be directly used as the index of the resource element group. In this case, the index of the resource element group still includes two values. Alternatively, calculation may be performed on a symbol and a subcarrier number of a resource element in the resource element group, and one value is eventually obtained as the index of the resource element group. Optionally, a value obtained through calculation on the symbol and the subcarrier number of the resource element occupying the minimum symbol in the resource element group may be directly used as the index of the resource element group, or a value obtained through calculation on the symbol and the subcarrier number of the resource element occupying the minimum subcarrier in the resource element group may be directly used as the index of the resource element group.

Optionally, in this embodiment of this application, an index of each resource element set corresponds to a symbol and a subcarrier number of at least one resource element in the resource element set. Optionally, in this embodiment of this application, an index is set for each resource element set. The index may also be referred to as an identifier, and may uniquely determine the resource element set. The index of the resource element set corresponds to a symbol and a subcarrier number of at least one resource element in the resource element set. For example, a symbol and a subcarrier number of a resource element in the resource element set are directly used as the index of the resource element set. In this case, the index of the resource element set includes two values.

In an optional implementation, a resource element occupying a minimum symbol in the resource element set is determined. If a plurality of resource elements occupy the minimum symbol, a resource element occupying a minimum subcarrier number is determined from the plurality of resource elements occupying the minimum symbol, and a symbol and a subcarrier number of the resource element are directly used as the index of the resource element set.

In another optional implementation, a resource element occupying a minimum subcarrier number in the resource element set is determined. If a plurality of resource elements occupy the minimum subcarrier number, a resource element occupying a minimum symbol is determined from the plurality of resource elements occupying the minimum subcarrier number, and a symbol and a subcarrier number of the resource element are directly used as the index of the resource element set.

Alternatively, a symbol and a subcarrier number of a resource element in the resource element set may be processed to obtain a value as the index of the resource element set. In an optional implementation, a resource element occupying a minimum symbol in the resource element set is determined. If a plurality of resource elements occupy the minimum symbol, a resource element occupying a minimum subcarrier number is determined from the plurality of resource elements occupying the minimum symbol, and a symbol and a subcarrier number of the resource element are processed to obtain a value as the index of the resource element set. In another optional implementation, a resource element occupying a minimum subcarrier number in the resource element set is determined. If a plurality of resource elements occupy the minimum subcarrier number, a resource element occupying a minimum symbol is determined from the plurality of resource elements occupying the minimum subcarrier number, and a symbol and a subcarrier number of the resource element are processed to obtain a value as the index of the resource element set.

Two contiguous resource element sets may be two resource element sets occupying a same frequency domain subcarrier and adjacent time domain symbols, or may be two resource element sets occupying a same time domain symbol and adjacent frequency domain subcarriers.

FIG. 4*i* is an example schematic structural diagram of a resource element according to an embodiment of this application. As shown in FIG. 4*h*, in the time domain, each resource element occupies one symbol represented by a letter 1. On a time domain coordinate, the first symbol is represented by 1, and then the second symbol is represented by l+1; on a frequency domain coordinate, a number of the first subcarrier is represented by k, and then a number of the second subcarrier is represented by k+1; and so on. If a resource element group occupies the symbol 1 in the time domain, and occupies subcarriers k to k+11 in the frequency domain, an index of the resource element group may be represented by a symbol and a subcarrier identifier of a resource element with a minimum symbol or a minimum subcarrier number in the resource element group. For example, the index of the resource element group may be represented by (k, 1).

Optionally, in a resource element group set, a symbol of a resource element included in a resource element group may be defined as follows:

$$1 = 1_0, (\text{or } 1 = 1_0 + 0), 1 = 1_0 + 1, 1 = 1_0 + 2, \ldots, \text{ and } 1 = 1_0 + (N-1);$$

and a number of a subcarrier of the resource element included in the resource element group may be defined as follows:

$$k = k_0 + 0, k_0 + 1, k_0 + 2, \ldots, k_0 + 11, \ldots,$$

$$\text{and } k = k_0 + x, k_0 + x + 1, k_0 + x + 2, \ldots, k_0 + (x + 11);$$

where x=M−1; M and N herein are configured by using higher layer signaling, and are positive integers greater than or equal to 1.

If it is determined that M=1 and N=2 as indicated in the higher layer signaling, for a $u^{th}$ resource element group set, a symbol of a resource element included in a resource element group in the $u^{th}$ resource element group set may be defined as follows:

$$1 = 1_0, (\text{or } 1 = 1_0 + 0), \text{ and } 1 = 1_0 + 1;$$

and a number of a subcarrier of the resource element included in the resource element group in the $u^{th}$ resource element group set may be defined as follows:

$$k = k_0 + 0, k_0 + 1, k_0 + 2, \ldots, k_0 + 11;$$

where for $k_0$ and $l_0$ corresponding to the $u^{th}$ resource element group set, $k_0 = u \cdot M \cdot N^{RB}_{sc} \bmod N^{DL}_{RB} N^{RB}_{sc}$, where $N^{RB}_{sc}$ is a quantity of subcarriers included in a resource element group; and $l_0 = \lfloor u \cdot M/N^{DL}_{RB} \rfloor$. Optionally, M and N are configured by using higher layer signaling, and are positive integers greater than or equal to 1. Correspondingly, the number u of the resource element group set corresponds to a subcarrier with a minimum number and an OFDM symbol with a minimum number in the resource element group. $\lfloor \cdot \rfloor$ represents rounding down. $N^{DL}_{RB}$ may represent a total quantity of resource element groups included on a frequency domain resource on which a downlink control channel is located.

Optionally, based on a correspondence between a resource element group set and a resource element group, a number of the resource element group set may be defined as follows:

According to definition of the resource element group set, a control channel may include a plurality of resource element group sets, a plurality of resource element sets are sequentially numbered 0, . . . , and $N_{GREG}$−1, where GREG represent a group of resource element groups, and $N_{GREG}$ represents a quantity of the plurality of resource element group sets included in the control channel. Assuming that u is used as the number of the resource element set, and u∈{0, . . . , $N_{GREG}$−1}, a subcarrier that has a minimum number and that corresponds to a $u^{th}$ resource element set in the frequency domain is $k_0 = u \cdot M \cdot N^{RB}_{sc}$. Alternatively, based on the number u and N, a number $n_{RB}$ of a physical resource block corresponding to a resource element group in the frequency domain is determined, where $n_{RB}$ satisfies $n_{RB}$ mod M=0, or $n_{RB}$=u·M, or $n_{RB}$=u·M+A, where A may be a random variable, and mod is a modulo operation.

In this embodiment of this application, a number of a physical resource block and a number of a resource element group are the same in the frequency domain. Therefore, the number of the physical resource block in the frequency domain and the number of the resource element group in the frequency domain that are described in this embodiment of this application may be understood as a same value.

Optionally, the configuration information may further include indication information of resources occupied in the time domain and the frequency domain by each resource element group included in each of the at least one resource element set. In this way, when a resource element set includes resource element groups in different structural forms, the resource element groups may be indicated separately.

Optionally, the resource element set in this embodiment of this application may include one or more resource element groups with a same structure, or structures of two resource element groups included in the resource element set may be different. FIG. 4*j* shows example schematic structural diagrams of resource element sets according to an embodiment of this application. As shown in FIG. 4*j*, a resource element set with resource element set pattern information 0 includes one resource element group. In the resource element group, 10 resource elements are used to carry control information, and the other two resource elements are used to carry a reference signal. As shown in FIG. 4*j*, a resource element set with resource element set pattern information 1 includes two resource element groups. The two resource element groups are contiguously arranged in the frequency domain direction. In each of the two resource element groups, 10 resource elements are used to carry control information, and the other two resource elements are used to carry a reference signal. As shown in FIG. 4*j*, a resource element set with resource element set pattern information 6 includes three resource element groups. The three resource element groups are contiguously arranged in a time domain direction. In each of the top resource element group and the bottom resource element group, 10 resource elements are used to carry control information, and the other two resource elements are used to carry a reference signal; in the middle resource element group, all resource elements are used to carry control information. Other resource element set patterns are similar to the foregoing content, and are not described herein one by one.

With reference to the structures shown in FIG. 4*j*, an embodiment of this application further provides PCDDH format information. Table 1 schematically shows physical downlink control channel (PDCCH) formats corresponding to the resource element set pattern information 0, the resource element set pattern information 1, resource element set pattern information 2, or resource element set pattern information 3 in FIG. 4*j*. Table 2 schematically shows PDCCH formats corresponding to resource element set pattern information 4 or resource element set pattern information 5 in FIG. 4*j*. Table 3 schematically shows PDCCH formats corresponding to the resource element set pattern information 6 in FIG. 4*j*. Table 4 schematically shows PDCCH formats corresponding to resource element set pattern information 7 or resource element set pattern information 8 in FIG. 4*j*. Table 5 schematically shows PDCCH formats corresponding to resource element set pattern information 9 in FIG. 4*j*.

TABLE 1

PDCCH formats corresponding to the resource element set pattern information 0, the resource element set pattern information 1, the resource element set pattern information 2, or there source element set pattern information 3 in FIG. 4j

| PDCCH format | Quantity of CCEs | Quantity of resource element groups | PDCCH bit size |
|---|---|---|---|
| 0 | 1 | 6 | 120 |
| 1 | 2 | 12 | 240 |
| 2 | 4 | 24 | 480 |
| 3 | 8 | 48 | 960 |

Optionally, PDCCH formats corresponding to the resource element set pattern information 1 in FIG. 4*j* are a PDCCH format 0 and a PDCCH format 1. PDCCH formats corresponding to the resource element set pattern information 3 in FIG. 4*j* are a PDCCH format 2 and a PDCCH format 3.

Therefore, in this method, the PDCCH formats correspond to different aggregation levels of control channel search space. For example, in Table 1, the PDCCH format 0 corresponds to an aggregation level 1, the PDCCH format 1 corresponds to an aggregation level 2, the PDCCH format 2 corresponds to an aggregation level 4, and the PDCCH format 3 corresponds to an aggregation level 8. Different resource element sets may correspond to one or more PDCCH formats. Different patterns of resource element sets in FIG. 4*j* may correspond to a same or different PDCCH formats. Alternatively, different patterns of resource element sets in FIG. 4*j* may correspond to a same or different aggregation levels.

In a feasible embodiment, a pattern of a resource element set included in a first control channel resource is the resource element set pattern 1 shown in FIG. 4*j*, corresponding control channel formats are the PDCCH format 0 and the PDCCH format 1 in Table 1, and corresponding search space aggregation levels are the aggregation level 1 and the aggregation level 2. In addition, a system further includes a second control channel resource, a pattern of a resource element set included in the second control channel resource is the resource element set pattern 3 shown in FIG. 4*j*, corresponding control channel formats are the PDCCH format 2 and the PDCCH format 3 in Table 1, and corresponding search space aggregation levels are the aggregation level 4 and the aggregation level 8.

TABLE 2

PDCCH formats corresponding to the resource element set pattern information 4 or the resource element set pattern information 5 in FIG. 4j

| PDCCH format | Quantity of CCEs | Quantity of resource element groups | PDCCH bit size |
|---|---|---|---|
| 0 | 1 | 6 | 132 |
| 1 | 2 | 12 | 264 |
| 2 | 4 | 24 | 528 |
| 3 | 8 | 48 | 1056 |

TABLE 3

PDCCH formats corresponding to the resource element set pattern information 6 in FIG. 4j

| PDCCH format | Quantity of CCEs | Quantity of resource element groups | PDCCH bit size |
|---|---|---|---|
| 0 | 1 | 6 | 128 |
| 1 | 2 | 12 | 256 |
| 2 | 4 | 24 | 512 |
| 3 | 8 | 48 | 1024 |

TABLE 4

PDCCH formats corresponding to the resource element set pattern information 7 or the resource element set pattern information 8 in FIG. 4j

| PDCCH format | Quantity of CCEs | Quantity of resource element groups | PDCCH bit size |
|---|---|---|---|
| 0 | 1 | 6 | 96 |
| 1 | 2 | 12 | 192 |
| 2 | 4 | 24 | 384 |
| 3 | 8 | 48 | 768 |

TABLE 5

PDCCH formats corresponding to the resource element set pattern information 9 in FIG. 4j

| PDCCH format | Quantity of CCEs | Quantity of resource element groups | PDCCH bit size |
|---|---|---|---|
| 0 | 1 | 6 | 120 |
| 1 | 2 | 12 | 240 |
| 2 | 4 | 24 | 480 |
| 3 | 8 | 48 | 960 |

After the network device determines the configuration information, when the control information is determined, the network device maps the control information to a resource element set based on the configuration information. Usually, the control information is downlink control information. There is one or more pieces of downlink control information. Each piece of control information is a bit sequence. Bit sequences of a plurality of pieces of control information are sequentially arranged and are scrambled and modulated to obtain E modulated symbols corresponding to the control information that needs to be sent. The E modulated symbols are sequenced in an arrangement order of the bit sequences of the control information.

Optionally, the mapping, by the network device, control information to one or more of the at least one resource element set based on the configuration information includes: mapping, by the network device, the control information and a reference signal to the one or more of the at least one resource element set based on the configuration information, where the reference signal is mapped to one or more resource elements in a resource element set including the control information. Correspondingly, the monitoring, by the terminal device, the control channel based on the configuration information, to obtain the control information mapped to the one or more of the at least one resource element set includes: monitoring, by the terminal device, the control channel based on the configuration information, to obtain the control information mapped to the one or more of the at least one resource element set, and obtain the reference signal mapped to the one or more resource elements in the resource element set including the control information. In this way, a resource element set that does not send the control information can be prevented from carrying a control signal, and resource wastes are reduced.

Optionally, that the network device maps the control information for the terminal to the at least one resource element set based on the configuration information includes: The network device modulates the control information to obtain E modulated symbols, where E is an integer greater than or equal to 5. The network device maps E/F modulated symbol groups and a reference signal to the at least one resource element set.

In other words, in this embodiment of this application, the control information is mapped to the resource element set at a granularity of using F modulated symbols as a group. Because a resource element set may include one or more resource element groups, joint channel estimation may be performed by using reference signals in all resource element groups included in the resource element set, thereby improving channel estimation accuracy.

In this embodiment of this application, optional implementation solutions are provided. In an optional implementation solution, the E/F modulated symbol groups are interleaved, for example, rearranged and/or shifted, to change an order of the control information at the granularity of using F modulated symbols as a group. Specifically, the network device uses F modulated symbols of the E modulated symbols to form a modulated symbol group, and interleaves E/F modulated symbol groups corresponding to the E modulated symbols, where F is an integer less than or equal to E and greater than 4. The network device maps the interleaved E/F modulated symbol groups and the reference signal to the at least one resource element set, where one modulated symbol group is mapped to one resource element set, and if control information is mapped to a resource element set, a reference signal is mapped to the resource element set. If no control information is mapped to a resource element set, no reference signal is mapped to the resource element set. In this way, when the control information is mapped to a plurality of resource element sets, the control information can be distributed wider in the frequency domain and/or the time domain, and a larger frequency domain diversity gain and a larger time domain diversity gain are obtained.

Further, in this embodiment of this application, when the E/F modulated symbol groups and the reference signal are mapped to the plurality of resource element sets, arrangement may be performed in a time-first or frequency-first manner. For example, numbers of resource element sets and resource element groups are given, and the network device needs to map the E/F modulated symbol groups and the reference signal to six resource element sets. In the frequency domain with a subcarrier number 1, the resource element sets sequentially include a resource element set 1 with a symbol 1, a resource element set 2 with a symbol 2, and a resource element set 3 with a symbol 3. In the frequency domain with a subcarrier number 2, the resource element sets sequentially include a resource element set 4 with the symbol 1, a resource element set 5 with the symbol 2, and a resource element set 6 with the symbol 3. If the time-first manner is used, an order that the E/F modulated symbol groups and the reference signal are mapped to the six resource element sets are: the resource element set 1, the resource element set 2, the resource element set 3, the resource element set 4, the resource element set 5, and the resource element set 6 in sequence. If the frequency-first manner is used, an order that the E/F modulated symbol groups and the reference signal are mapped to the six resource element sets are: the resource element set 1, the resource element set 4, the resource element set 2, the resource element set 5, the resource element set 3, and the resource element set 6 in sequence.

Further, in this embodiment of this application, when the E/F modulated symbol groups and the reference signal are mapped to the plurality of resource element sets, arrangement may be performed in a time-first or frequency-first manner. For example, the network device needs to map the E/F modulated symbol groups and the reference signal to six resource element sets. In the frequency domain with a subcarrier number 1, the resource element sets sequentially include a resource element set 1 with a symbol 1, a resource element set 2 with a symbol 2, and a resource element set 3 with a symbol 3. In the frequency domain with a subcarrier number 2, the resource element sets sequentially include a resource element set 4 with the symbol 1, a resource element set 5 with the symbol 2, and a resource element set 6 with the symbol 3. If the time-first manner is used, an order that the E/F modulated symbol groups and the reference signal are mapped to the six resource element sets are: the resource element set 1, the resource element set 2, the resource element set 3, the resource element set 4, the resource element set 5, and the resource element set 6 in sequence. If the frequency-first manner is used, an order that the E/F modulated symbol groups and the reference signal are mapped to the six resource element sets are: the resource element set 1, the resource element set 4, the resource element set 2, the resource element set 5, the resource element set 3, and the resource element set 6 in sequence.

Figure 4K:
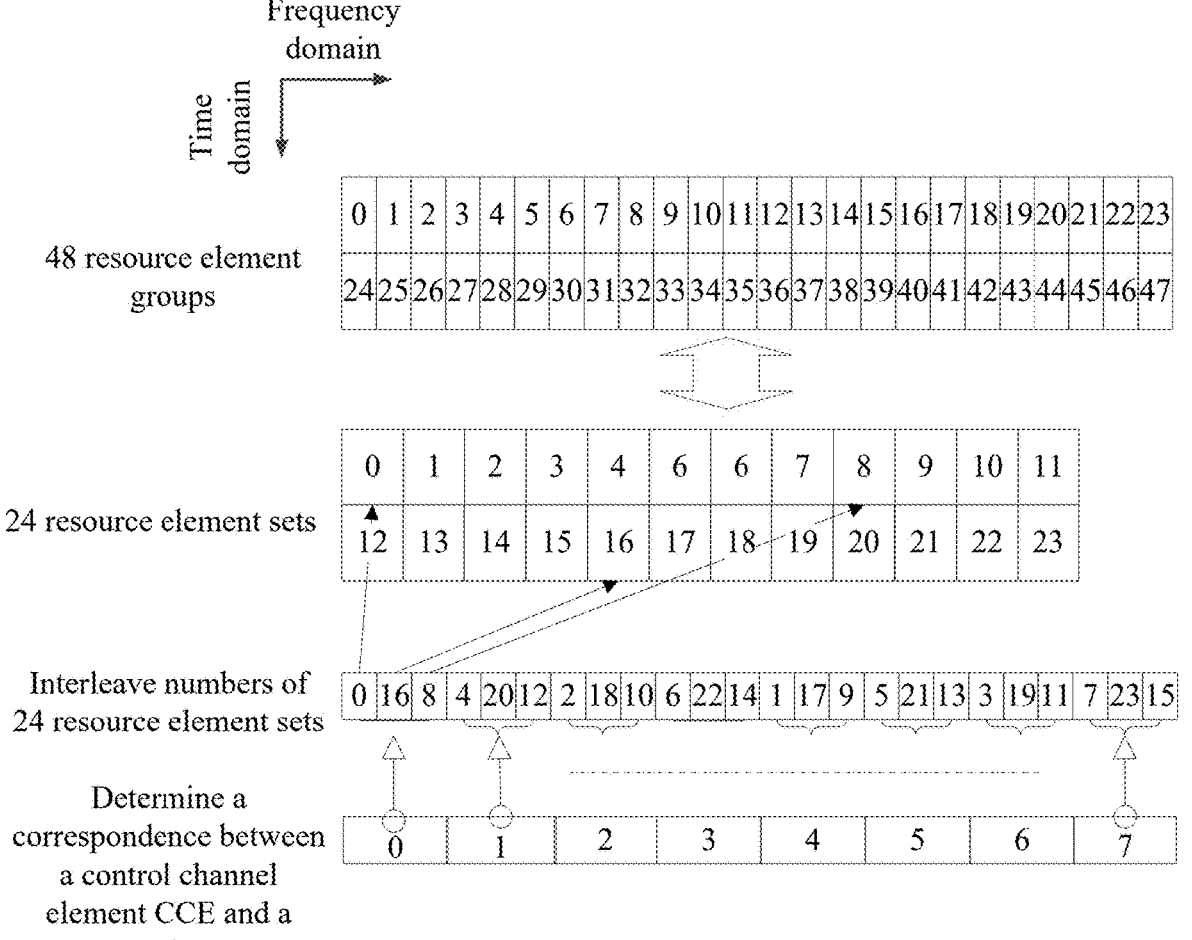
FIG. 4*k* is a schematic flowchart of mapping a bit sequence of control information according to an embodiment of this application.

In another optional implementation solution, numbers or indexes of resource element sets are interleaved, to change an order of the control information at the granularity of using F modulated symbols as a group. FIG. 4k is an example schematic flowchart of mapping a bit sequence of control information according to an embodiment of this application. Each terminal device corresponds to one or more CCEs. Each CCE may include one or more resource element sets. As shown in FIG. 4k, a CCE includes three resource element sets. Optionally, in this embodiment of this application, in FIG. 4k, 48 resource element groups are divided into 24 resource element sets. In this embodiment of this application, numbers of the 24 resource element sets are interleaved, for example, rearranged and/or shifted. As shown in FIG. 4k, an order of the numbers of the resource element sets is changed after the numbers of the 24 resource element sets are interleaved, and then control information corresponding to a CCE is mapped to a resource element group corresponding to numbers of three contiguous resource element sets. In this way, when the control information is mapped to a plurality of resource element sets, the control information can be distributed wider in the frequency domain and/or the time domain, and a larger frequency domain diversity gain and a larger time domain diversity gain are obtained.

In a third optional implementation solution, the E/F modulated symbol groups are interleaved, and numbers or indexes of resource element sets are interleaved, to change an order of the control information at the granularity of using F modulated symbols as a group.

Based on the foregoing solution, in this embodiment of this application, a correspondence between each of the E/F modulated symbol groups and a resource element set is obtained, where one modulated symbol group corresponds to one resource element set.

Optionally, that the network device maps the interleaved N/K modulated symbol groups and the reference signal to the at least one resource element set includes: The network device maps the interleaved N/K modulated symbol groups and the reference signal to the at least one resource element set in a time-first manner or a frequency-first manner. In the time-first manner, the control information and/or the reference signal may be mapped first in the time domain direction. In the frequency-first manner, the control information and/or the reference signal may be mapped first in the frequency domain direction.

Optionally, the configuration information further includes at least one of the following content: indication information of a mapping manner for the control information, where the mapping manner includes the time-first manner or the frequency-first manner.

In an optional implementation, the mapping, by the network device, control information to one or more of the at least one resource element set based on the configuration information includes: performing, by the network device, mapping based on an index of the resource element set.

Correspondingly, if the control information is mapped by the network device based on the index of the resource element set, the monitoring, by the terminal device, the control channel based on the configuration information, to obtain the control information mapped to the one or more of the at least one resource element set includes: monitoring, by the terminal device, the control channel of the terminal device based on the configuration information and the index of the resource element set, to obtain the control information mapped to the one or more of the at least one resource element set.

For example, when FIG. 4i shows one resource element set, mapping is performed based only on an index of the resource element set. If the time-first manner is used, numbers of resource elements for mapping are (k, 1), (k, 1+1), (k+1, 1), (k+1, 1+1), (k+2, 1), (k+2, 1+1), (k+3, 1), (k+3, 1+1), (k+4, 1), (k+4, 1+1), (k+5, 1), (k+5, 1+1), (k+6, 1), (k+6, 1+1), (k+7, 1), (k+7, 1+1), (k+8, 1), (k+8, 1+1), (k+9, 1), (k+9, 1+1), (k+10, 1), (k+10, 1+1), (k+11, 1), and (k+11, 1+1) in sequence. If the frequency-first manner is used, numbers of resource elements for mapping are (k, 1), (k+1, 1), (k+2, 1), (k+3, 1), (k+4, 1), (k+5, 1), (k+6, 1), (k+7, 1), (k+8, 1), (k+9, 1), (k+10, 1), (k+11, 1), (k, 1+1), (k+1, 1+1), (k+2, 1+1), (k+3, 1+1), (k+4, 1+1), (k+5, 1+1), (k+6, 1+1), (k+7, 1+1), (k+8, 1+1), (k+9, 1+1), (k+10, 1+1), and (k+11, 1+1) in sequence.

In another optional implementation, the mapping, by the network device, control information to one or more of the at least one resource element set based on the configuration information includes: performing, by the network device, mapping based on an index of a resource element group included in the resource element set.

Correspondingly, if the control information is mapped by the network device based on the index of the resource element group included in the resource element set, the monitoring, by the terminal device, the control channel based on the configuration information, to obtain the control information mapped to the one or more of the at least one resource element set includes: monitoring, by the terminal device, the control channel of the terminal device based on the configuration information and the index of the resource element group included in the resource element set, to obtain the control information mapped to the one or more of the at least one resource element set.

For example, FIG. 4i shows one resource element set, the set includes two resource element groups, a first resource element group includes 12 subcarriers with a symbol 1 and subcarrier numbers k to k+11, and a second resource element group includes 12 subcarriers with a symbol 2 and subcarrier numbers k to k+11.

For example, FIG. 4i shows when there is one resource element set, mapping is performed based only on an index of the resource element set. If the time-first manner is used, the resource element group with the symbol 1 is mapped first, and then the resource element group with the symbol 2 is mapped. If the frequency-first manner is used, the resource element set in FIG. 4i further includes a third resource element group above k+11, and the third resource element group includes 12 subcarriers with the symbol 1 and subcarrier numbers k+12 to k+23, the first resource element group with the symbol 1 is mapped first, then the third resource element group with the symbol 1 is mapped, and subsequently, the resource element group with the symbol 2 is mapped. Optionally, how to map the control information among resource element groups is not limited in this implementation solution, and either the frequency-first manner or the time-first manner may be used.

In a third optional implementation, the mapping, by the network device, control information to one or more of the at least one resource element set based on the configuration information includes: performing, by the network device, mapping based on an index of the resource element set and an index of a resource element group included in the resource element set.

Correspondingly, if the control information is mapped by the network device based on the index of the resource element set and the index of the resource element group included in the resource element set, the monitoring, by the terminal device, the control channel based on the configuration information, to obtain the control information mapped to the one or more of the at least one resource element set includes: monitoring, by the terminal device, the control channel of the terminal device based on the configuration information, the index of the resource element set, and the index of the resource element group included in the resource element set, to obtain the control information mapped to the one or more of the at least one resource element set.

For example, FIG. 4i shows one resource element set, the set includes two resource element groups, a first resource element group includes 12 subcarriers with a symbol 1 and subcarrier numbers k to k+11, and a second resource element group includes 12 subcarriers with a symbol 2 and subcarrier numbers k to k+11.

For example, FIG. 4i shows when there is one resource element set, mapping is performed based only on an index of the resource element set. If the time-first manner is used, the resource element group with the symbol 1 is mapped first, and then the resource element group with the symbol 2 is mapped. If the frequency-first manner is used, the resource element set in FIG. 4i further includes a third resource element group above k+11, and the third resource element group includes 12 subcarriers with the symbol 1 and subcarrier numbers k+12 to k+23, the first resource element group with the symbol 1 is mapped first, then the third resource element group with the symbol 1 is mapped, and subsequently, the resource element group with the symbol 2 is mapped.

Further, if the time-first manner is used, the control information is still mapped among the resource element groups in the time-first manner; if the frequency-first manner is used, the control information is still mapped among the resource element groups in the frequency-first manner.

For example, in FIG. 4i, if the time-first manner is used, numbers of resource elements in the first resource element group for mapping are (k, 1), (k+1, 1), (k+2, 1), (k+3, 1), (k+4, 1), (k+5, 1), (k+6, 1), (k+7, 1), (k+8, 1), (k+9, 1), (k+10, 1), and (k+11, 1) in sequence.

Further, in this embodiment of this application, optionally, the configuration information further includes a power ratio of control information to a reference signal in a resource element set, to which the control information is mapped, of the at least one resource element set. In this way, channel estimation can be more accurately performed based on the power ratio of control information to a reference signal.

For example, if it is indicated that the power ratio of control information to a reference signal in the resource element set is 1, the terminal device may perform channel estimation based on a power ratio of a resource element on which the reference signal is located to a resource element carrying the control information. If it is indicated that the power ratio of control information to a reference signal in the resource element set is 2, the terminal device adjusts a channel estimation parameter based on the power ratio of control information to a reference signal in the resource element set, and then performs channel estimation.

Figure 4L:
FIG. 4*l* is a schematic structural diagram of mapping a reference signal and control information of a single-antenna port to a resource element group according to an embodiment of this application.

FIG. 4l is an example schematic structural diagram of mapping a reference signal and control information of a single-antenna port to a resource element group according to an embodiment of this application. As shown in FIG. 4l, in a resource element group, two resource elements may be used to carry a reference signal. If reference signal power indication information indicates that a power ratio is 1 or 2, a quantity and locations of resource elements used to transmit control information are kept unchanged.

FIG. 4m and FIG. 4n are example schematic structural diagrams of mapping a reference signal and control information of a dual-antenna port to a resource element group according to an embodiment of this application. As shown in FIG. 4m, in a resource element group, four resource elements may be used to carry a reference signal. If a power ratio of control information to a reference signal in a resource element set is 1 (or 0 dB), resource mapping for a reference signal and downlink control information is shown in FIG. 4m. If a power ratio of control information to a reference signal in a resource element set is 2 (or 3 dB), resource mapping for a reference signal and downlink control information is shown in FIG. 4n. Through this solution, reference signal transmit power can be increased, thereby improving channel estimation performance.

Further, in this embodiment of this application, optionally, the network device may send the configuration information to the terminal device by using higher layer signaling, for example, RRC signaling or system information. Optionally, at least one of the frequency domain information and the time domain information, in the configuration information, of the time-frequency resource occupied by the control channel may be transmitted by using broadcast signaling sent on a broadcast channel.

Optionally, the configuration information of the control channel may be indirectly sent to the terminal device through a broadcast channel. For example, during initial access, for a time-frequency resource of a control channel including common search space, because the terminal device has not accessed the network device, the network device can use only broadcast information sent on a broadcast channel to configure the time-frequency resource of the control channel including the common search space. The broadcast information includes one or more of time domain and/or frequency domain indication information of the time-frequency resource of the control channel, reference-signal-related configuration information (for example, a location of a time-frequency resource for carrying a reference signal, or an initial value of a reference signal sequence), resource element set configuration information, or a resource mapping manner for control information.

Optionally, when the resource element set configuration information does not include the configuration information, resource element set configuration may be notified to the terminal device or the network device in a predefined manner.

In a feasible implementation, the resource element set configuration information is the resource element set pattern information 1 in FIG. 4j, and the resource mapping manner may be the predefined frequency-first mapping manner.

FIG. 5 is an example schematic structural diagram of a network device according to this application.

Based on a same idea, this application provides a network device 400, configured to perform any solution in the foregoing method. As shown in FIG. 5, the network device 400 includes a processor 401, a transceiver 402, a memory 403, and a communications interface 404. The processor 401, the transceiver 402, the memory 403, and the communications interface 404 are connected to each other by using a bus 405.

The bus 405 may be a peripheral component interconnect (PCI) bus, an extended industry standard architecture (EISA) bus, or the like. The bus may include an address bus, a data bus, a control bus, and the like. For ease of representation, the bus in FIG. 5 is represented by using only one bold line, but it does not mean that there is only one bus or only one type of bus.

The memory 403 may include a volatile memory, for example, a random-access memory (RAM), and may also include a non-volatile memory, for example, a flash memory, a hard disk drive (HDD), or a solid-state drive (SSD). The memory 403 may further include a combination of these memories.

The communications interface 404 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The processor 401 may be a central processing unit (CPU), a network processor (NP), or a combination thereof. The processor 401 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or a combination thereof.

Optionally, the memory 403 may be further configured to store a program instruction, and the processor 401 invokes the program instruction stored in the memory 403, to perform one or more steps or optional implementations in the embodiments in the foregoing solution, so that the network device 400 implements a function of a network device in the foregoing method.

The processor 401 is configured to execute the instruction stored in the memory, and control the transceiver 402 to receive and send signals, and when the processor 401 executes the instruction stored in the memory, the network device 400 may be configured to perform the following content.

The processor is configured to determine configuration information of a control channel, where the configuration information includes frequency domain information and/or time domain information used to indicate a time-frequency resource occupied by the control channel, and includes indication information used to indicate at least one resource element set, wherein the time-frequency resource occupied by the control channel includes the at least one resource element set; and map control information to one or more of the at least one resource element set based on the configuration information. The transceiver is configured to send the configuration information to a terminal device, and send the control information to the terminal device.

Optionally, the indication information used to indicate the at least one resource element set includes frequency domain information and/or time domain information of the at least one resource element set.

Optionally, the indication information used to indicate the at least one resource element set includes pattern information of the at least one resource element set.

Optionally, each of the at least one resource element set includes at least one resource element group, where the resource element group occupies one contiguous symbol in time domain, and occupies 12 contiguous subcarriers in frequency domain.

Optionally, the indication information used to indicate the at least one resource element set includes at least one of information about a resource element group included in the at least one resource element set in the frequency domain and information about a resource element group included in the at least one resource element set in the time domain.

Optionally, a structural form of each of the at least one resource element set is similar to that shown in FIG. 4a to FIG. 4h, and details are not described herein again.

Optionally, the processor is configured to perform mapping based on at least one of an index of the resource element set and an index of a resource element group included in the resource element set.

Optionally, the index of the resource element set corresponds to a symbol and a subcarrier number of at least one resource element in the resource element set.

Optionally, the index of the resource element group corresponds to a symbol and a subcarrier number of at least one resource element in the resource element group.

Optionally, the configuration information further includes at least one of the following content: indication information of resources occupied in the time domain and the frequency domain by each resource element group included in each of the at least one resource element set; indication information of a mapping manner for the control information, where the mapping manner includes a time-first manner or a frequency-first manner; and a power ratio of control information to a reference signal in a resource element set, to which the control information is mapped, of the at least one resource element set.

Optionally, the mapping, by the network device, control information to one or more of the at least one resource element set based on the configuration information includes: mapping, by the network device, the control information and a reference signal to the one or more of the at least one resource element set based on the configuration information, where the reference signal is mapped to one or more resource elements in a resource element set including the control information.

Figure 6:
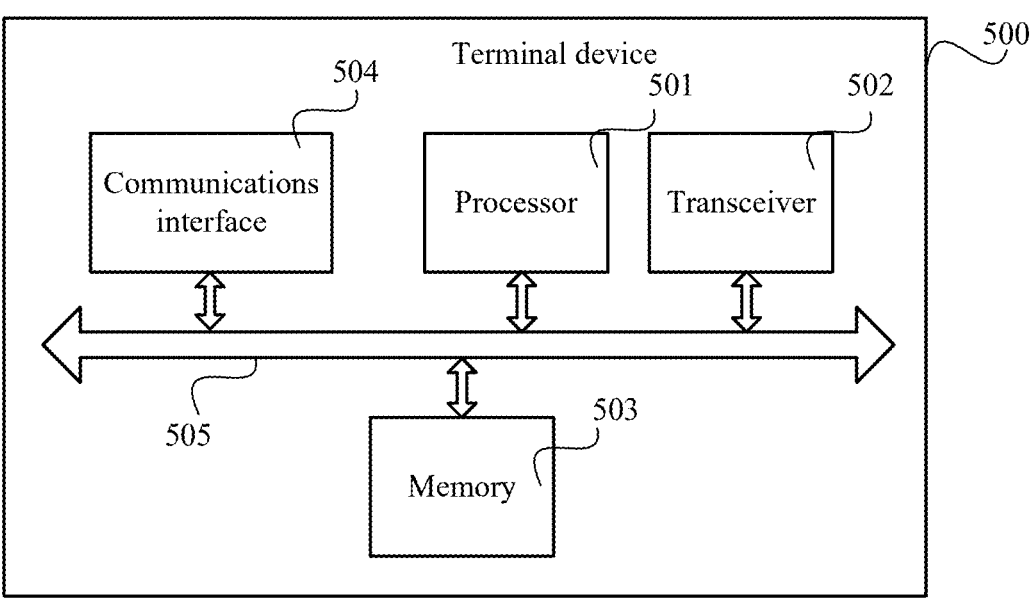
FIG. 6 is a schematic structural diagram of a terminal device for transmitting control information according to an embodiment of this application.

FIG. 6 is an example schematic structural diagram of a terminal device according to this application.

Based on a same idea, this application provides a terminal device 500, configured to perform any solution in the foregoing method. As shown in FIG. 6, the terminal device 500 includes a processor 501, a transceiver 502, a memory 503, and a communications interface 504. The processor 501, the transceiver 502, the memory 503, and the communications interface 504 are connected to each other by using a bus 505.

The bus 505 may be a peripheral component interconnect (PCI) bus, an extended industry standard architecture (EISA) bus, or the like. The bus may include an address bus, a data bus, a control bus, and the like. For ease of representation, the bus in FIG. 6 is represented by using only one bold line, but it does not mean that there is only one bus or only one type of bus.

The memory 503 may include a volatile memory, for example, a random-access memory (RAM), and may also include a non-volatile memory, for example, a flash memory, a hard disk drive (HDD) or a solid-state drive (SSD). The memory 503 may further include a combination of these memories.

The communications interface 504 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The processor 501 may be a central processing unit (CPU), a network processor (NP), or a combination thereof. The processor 501 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or a combination thereof.

Optionally, the memory 503 may be further configured to store a program instruction, and the processor 501 invokes the program instruction stored in the memory 503, to perform one or more steps or optional implementations in the embodiments in the foregoing solution, so that the terminal device 500 implements a function of a terminal device in the foregoing method.

The processor 501 is configured to execute the instruction stored in the memory, and control the transceiver 502 to receive and send signals, and when the processor 501 executes the instruction stored in the memory, the terminal device 500 may be configured to perform the following content.

The transceiver is configured to receive configuration information sent by a network device, where the configuration information includes frequency domain information and/or time domain information used to indicate a time-frequency resource occupied by a control channel, and includes indication information used to indicate at least one resource element set, wherein the time-frequency resource occupied by the control channel includes the at least one resource element set. The processor is configured to monitor the control channel of the terminal device based on the configuration information, to obtain control information mapped to one or more of the at least one resource element set, where the control information is carried on the one or more of the at least one resource element set.

Because the network device maps the control information to the one or more of the at least one resource element set based on the configuration information, the terminal device can perform joint channel estimation based on all reference signals included in a resource element set. A quantity of reference signals used in channel estimation is increased, and therefore channel estimation accuracy is improved without increasing reference signal density.

Optionally, the indication information used to indicate the at least one resource element set includes frequency domain information and/or time domain information of the at least one resource element set. Optionally, the indication information used to indicate the at least one resource element set includes pattern information of the at least one resource element set.

Optionally, each of the at least one resource element set includes at least one resource element group, where the resource element group occupies one contiguous symbol in time domain, and occupies 12 contiguous subcarriers in frequency domain. Optionally, the indication information used to indicate the at least one resource element set includes at least one of information about a resource element group included in the at least one resource element set in the frequency domain and information about a resource element group included in the at least one resource element set in the time domain.

Optionally, a structural form of each one of the at least one resource element set is similar to that shown in FIG. 4a to FIG. 4h, and details are not described herein again.

Optionally, if the control information is mapped by the network device based on an index of the resource element set and an index of a resource element group included in the resource element set, the processor is configured to monitor the control channel of the terminal device based on the configuration information, the index of the resource element set, and the index of the resource element group included in the resource element set, to obtain the control information mapped to the one or more of the at least one resource element set.

Optionally, if the control information is mapped by the network device based on an index of the resource element set, the processor is configured to monitor the control channel of the terminal device based on the configuration information and the index of the resource element set, to obtain the control information mapped to the one or more of the at least one resource element set.

Optionally, if the control information is mapped by the network device based on an index of a resource element group included in the resource element set, the processor is configured to monitor the control channel of the terminal device based on the configuration information and the index of the resource element group included in the resource element set, to obtain the control information mapped to the one or more of the at least one resource element set.

Optionally, the index of the resource element set corresponds to a symbol and a subcarrier number of at least one resource element in the resource element set. Optionally, the index of the resource element group corresponds to a symbol and a subcarrier number of at least one resource element in the resource element group. Optionally, the configuration information further includes at least one of the following content: indication information of a mapping manner for the control information, where the mapping manner includes a time-first manner or a frequency-first manner; and a power ratio of control information to a reference signal in a resource element set, to which the control information is mapped, of the at least one resource element set.

Optionally, the monitoring, by the terminal device, the control channel based on the configuration information, to obtain control information mapped to one or more of the at least one resource element set includes: monitoring, by the terminal device, the control channel based on the configuration information, to obtain the control information mapped to the one or more of the at least one resource element set, and obtain a reference signal mapped to one or more resource elements in a resource element set including the control information.

Figure 7:
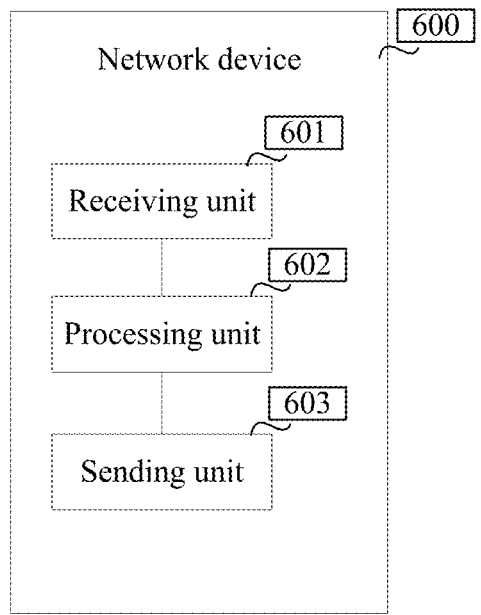
FIG. 7 is a schematic structural diagram of another network device for transmitting control information according to an embodiment of this application.

FIG. 7 is an example schematic structural diagram of a network device according to an embodiment of this application.

Based on a same idea, an embodiment of this application provides a network device, configured to perform any solution in the foregoing method. As shown in FIG. 7, a network device 600 includes a sending unit 603 and a processing unit 602. Optionally, the network device 600 further includes a receiving unit 601.

The processing unit is configured to determine configuration information of a control channel, where the configuration information includes frequency domain information and/or time domain information used to indicate a time-frequency resource occupied by the control channel, and includes indication information used to indicate at least one resource element set, wherein the time-frequency resource occupied by the control channel includes the at least one resource element set; and map control information to one or more of the at least one resource element set based on the configuration information. The sending unit is configured to send the configuration information to a terminal device, and send the control information to the terminal device. Optionally, the receiving unit is configured to receive other information, for example, service information used for various services, sent by the terminal device.

Because the network device maps the control information to the one or more of the at least one resource element set based on the configuration information, the terminal device can perform joint channel estimation based on all reference signals included in a resource element set. A quantity of reference signals used in channel estimation is increased, and therefore channel estimation accuracy is improved without increasing reference signal density.

Optionally, the indication information used to indicate the at least one resource element set includes frequency domain information and/or time domain information of the at least one resource element set. Optionally, the indication information used to indicate the at least one resource element set includes pattern information of the at least one resource element set.

Optionally, each of the at least one resource element set includes at least one resource element group, where the resource element group occupies one contiguous symbol in time domain, and occupies 12 contiguous subcarriers in frequency domain. Optionally, the indication information used to indicate the at least one resource element set includes at least one of information about a resource element group included in the at least one resource element set in the frequency domain and information about a resource element group included in the at least one resource element set in the time domain.

Optionally, a structural form of each one of the at least one resource element set is similar to that shown in FIG. 4a to FIG. 4h, and details are not described herein again.

Optionally, the processing unit is configured to perform mapping based on at least one of an index of the resource element set and an index of a resource element group included in the resource element set. Optionally, the index of the resource element set corresponds to a symbol and a subcarrier number of at least one resource element in the resource element set. Optionally, the index of the resource element group corresponds to a symbol and a subcarrier number of at least one resource element in the resource element group.

Optionally, the configuration information further includes at least one of the following content: indication information of resources occupied in the time domain and the frequency domain by each resource element group included in each of the at least one resource element set; indication information of a mapping manner for the control information, where the mapping manner includes a time-first manner or a frequency-first manner; and a power ratio of control information to a reference signal in a resource element set, to which the control information is mapped, of the at least one resource element set.

Optionally, the mapping, by the network device, control information to one or more of the at least one resource element set based on the configuration information includes: mapping, by the network device, the control information and a reference signal to the one or more of the at least one resource element set based on the configuration information, where the reference signal is mapped to one or more resource elements in a resource element set including the control information.

It should be understood that the foregoing division of units is merely division of logical functions. In actual implementation, all or some of the units may be integrated into a physical entity, or may be physically separated. In this embodiment of this application, the receiving unit 601 and the sending unit 603 may be implemented by the transceiver 402, and the processing unit 602 may be implemented by the processor 401. As shown in FIG. 5, the network device 400 may include the processor 401, the transceiver 402, and the memory 403. The memory 403 may be configured to store code used when the processor 401 executes a solution. The code may be a program/code pre-installed before delivery of the network device 400.

Figure 8:
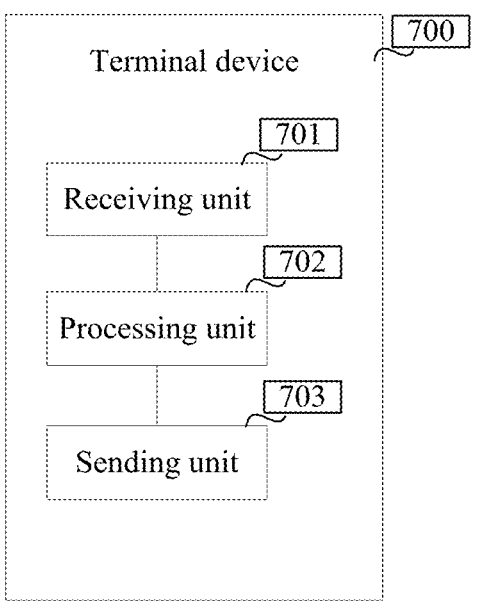
FIG. 8 is a schematic structural diagram of another terminal device for transmitting control information according to an embodiment of this application.

FIG. 8 is an example schematic structural diagram of a terminal device according to an embodiment of this application.

Based on a same idea, an embodiment of this application provides a terminal device, configured to perform any solution in the foregoing method. As shown in FIG. 8, a terminal device 700 includes a receiving unit 701 and a processing unit 702. Optionally, the terminal device 700 further includes a sending unit 703.

The receiving unit is configured to receive configuration information sent by a network device, where the configuration information includes frequency domain information and/or time domain information used to indicate a time-frequency resource occupied by a control channel, and includes indication information used to indicate at least one resource element set, wherein the time-frequency resource occupied by the control channel includes the at least one resource element set. The processing unit is configured to monitor the control channel of the terminal device based on the configuration information, to obtain control information mapped to one or more of the at least one resource element set, where the control information is carried on the one or more of the at least one resource element set. Optionally, the sending unit 703 is further configured to send other information, for example, service information for various services, to the network device.

Because the network device maps the control information to the one or more of the at least one resource element set based on the configuration information, the terminal device can perform joint channel estimation based on all reference signals included in a resource element set. A quantity of reference signals used in channel estimation is increased, and therefore channel estimation accuracy is improved without increasing reference signal density.

Optionally, the indication information used to indicate the at least one resource element set includes frequency domain information and/or time domain information of the at least one resource element set. Optionally, the indication information used to indicate the at least one resource element set includes pattern information of the at least one resource element set.

Optionally, each of the at least one resource element set includes at least one resource element group, where the resource element group occupies one contiguous symbol in time domain, and occupies 12 contiguous subcarriers in frequency domain. Optionally, the indication information used to indicate the at least one resource element set includes at least one of information about a resource element group included in the at least one resource element set in the frequency domain and information about a resource element group included in the at least one resource element set in the time domain.

Optionally, a structural form of each one of the at least one resource element set is similar to that shown in FIG. 4a to FIG. 4h, and details are not described herein again.

Optionally, if the control information is mapped by the network device based on an index of the resource element set and an index of a resource element group included in the resource element set, the processing unit is configured to monitor the control channel of the terminal device based on the configuration information, the index of the resource element set, and the index of the resource element group included in the resource element set, to obtain the control information mapped to the one or more of the at least one resource element set.

Optionally, if the control information is mapped by the network device based on an index of the resource element set, the processing unit is configured to monitor the control channel of the terminal device based on the configuration information and the index of the resource element set, to obtain the control information mapped to the one or more of the at least one resource element set.

Optionally, if the control information is mapped by the network device based on an index of a resource element group included in the resource element set, the processing unit is configured to monitor the control channel of the terminal device based on the configuration information and the index of the resource element group included in the resource element set, to obtain the control information mapped to the one or more of the at least one resource element set.

Optionally, the index of the resource element set corresponds to a symbol and a subcarrier number of at least one resource element in the resource element set. Optionally, the index of the resource element group corresponds to a symbol and a subcarrier number of at least one resource element in the resource element group. Optionally, the configuration information further includes at least one of the following content: indication information of a mapping manner for the control information, where the mapping manner includes a time-first manner or a frequency-first manner; and a power ratio of control information to a reference signal in a resource element set, to which the control information is mapped, of the at least one resource element set.

Optionally, the monitoring, by the terminal device, the control channel based on the configuration information, to obtain control information mapped to one or more of the at least one resource element set includes: monitoring, by the terminal device, the control channel based on the configuration information, to obtain the control information mapped to the one or more of the at least one resource element set, and obtain a reference signal mapped to one or more resource elements in a resource element set including the control information.

It should be understood that the foregoing division of units is merely division of logical functions. In actual implementation, all or some of the units may be integrated into a physical entity, or may be physically separated. In this embodiment of this application, the receiving unit 701 and the sending unit 703 may be implemented by the transceiver 502, and the processing unit 702 may be implemented by the processor 501. As shown in FIG. 6, the terminal device 500 may include the processor 501, the transceiver 502, and the memory 503. The memory 503 may be configured to store code used when the processor 501 executes a solution. The code may be a program/code pre-installed before delivery of the terminal device 500.

The foregoing embodiments may be all or partially implemented by software, hardware, firmware or any combination thereof. When being implemented by a software program, the embodiments may be all or partially implemented in a form of a computer program product. The computer program product includes one or more instructions. When the computer program instructions are loaded and executed on a computer, the procedures or functions according to the embodiments of this application are all or partially generated. The computer may be a general-purpose computer, a dedicated computer, a computer network, or other programmable apparatuses. The instructions may be stored in a computer storage medium or may be transmitted from a computer storage medium to another computer storage medium. For example, the instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible to a computer, or a data storage device, such as a server or a data center, integrating one or more usable media. The usable medium may be a magnetic medium (for example, a floppy disk, a hard disk, or a magnetic tape, or a magneto-optical disk (MO)), an optical medium (for example, a CD, a DVD, a BD, or an HVD), a semiconductor medium (for example, a ROM, an EPROM, an EEPROM, a non-volatile memory (NAND FLASH), or a solid state disk (SSD)), or the like.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer usable storage media (including but not limited to a disk memory, a CD-ROM, an optical memory, and the like) that include computer usable program code.

The embodiments of this application are described with reference to the flowcharts and/or block diagrams of the method, the device (system), and the computer program product according to the embodiments of this application. It should be understood that instructions may be used to implement each process and/or each block in the flowcharts and/or the block diagrams and a combination of a process and/or a block in the flowcharts and/or the block diagrams. These instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Apparently, a person skilled in the art can make various modifications and variations to the embodiments of this application without departing from the spirit and scope of this application. Therefore, this application is intended to cover these modifications and variations, provided that they fall within the scope of protection defined by the following claims and their equivalent technologies.

The invention claimed is:

1. A communication method, wherein the method comprises:

receiving configuration information of a control channel, wherein the configuration information of the control channel includes time-domain configuration information of a time-frequency resource of the control channel and configuration information of at least one resource element set, wherein the time-frequency resource of the control channel corresponds to at least one control channel element, each control channel element of the at least one control channel element has six resource element groups, each control channel element of the at least one control channel element includes one or more of the at least one resource element set, each resource element group of the six resource element groups belongs to one of the one or more of the at least one resource element set, and a quantity of resource element groups in each resource element set of the at least one resource element set is two, three, or six, and wherein each resource element group of the six resource element groups occupies one orthogonal frequency division multiplexing (OFDM) symbol in time domain, and occupies 12 contiguous subcarriers in frequency domain; and detecting the control channel based on the configuration information of the control channel.

2. The method according to claim 1, wherein each resource element set of the at least one resource element set has two resource element groups, wherein the two resource element groups occupy one OFDM symbol in the time domain, and occupy 24 contiguous subcarriers in the frequency domain.

3. The method according to claim 1, wherein each resource element set of the at least one resource element set has six resource element groups, wherein the six resource element groups occupy one OFDM symbol in the time domain, and occupy 72 contiguous subcarriers in the frequency domain.

4. The method according to claim 1, wherein each resource element set of the at least one resource element set has two resource element groups, wherein the two resource element groups occupy two contiguous OFDM symbols in the time domain, and occupy 12 contiguous subcarriers in the frequency domain.

5. The method according to claim 1, wherein each resource element set of the at least one resource element set has six resource element groups, wherein the six resource element groups occupy two contiguous OFDM symbols in the time domain, and occupy 36 contiguous subcarriers in the frequency domain.

6. The method according to claim 1, wherein each resource element set of the at least one resource element set has three resource element groups, wherein the three resource element groups occupy three contiguous OFDM symbols in the time domain, and occupy 12 contiguous subcarriers in the frequency domain.

7. The method according to claim 1, wherein each resource element set of the at least one resource element set has six resource element groups, wherein the six resource element groups occupy three contiguous OFDM symbols in the time domain, and occupy 24 contiguous subcarriers in the frequency domain.

8. The method according to claim 1, wherein the at least one resource element set is interleaved based on numbers of the at least one resource element set.

9. The method according to claim 1, wherein the control channel is a physical downlink control channel (PDCCH).

10. An apparatus, comprising one or more processors in communications with a non-transitory memory storing executable instructions, wherein the executable instructions, when executed by at least one processor of an apparatus, cause the apparatus to:

receive configuration information of a control channel, wherein the configuration information of the control channel includes time-domain configuration information of a time-frequency resource of the control channel and configuration information of at least one resource element set, wherein the time-frequency resource of the control channel corresponds to at least one control channel element, each control channel element of the at least one control channel element has six resource element groups, each control channel element of the at least one control channel element includes one or more of the at least one resource element set, each resource element group of the six resource element groups belongs to one of the one or more of the at least one resource element set, and a quantity of resource element groups in each resource element set of the at least one resource element set is two, three, or six, and wherein each resource element group of the six resource element groups occupies one orthogonal frequency division multiplexing (OFDM) symbol in time domain, and occupies 12 contiguous subcarriers in frequency domain; and detect the control channel based on the configuration information of the control channel.

11. The apparatus according to claim 10, wherein each resource element set of the at least one resource element set has two resource element groups, wherein the two resource element groups occupy one OFDM symbol in the time domain, and occupy 24 contiguous subcarriers in the frequency domain.

12. The apparatus according to claim 10, wherein each resource element set of the at least one resource element set has six resource element groups, wherein the six resource element groups occupy one OFDM symbol in the time domain, and occupy 72 contiguous subcarriers in the frequency domain.

13. The apparatus according to claim 10, wherein each resource element set of the at least one resource element set has two resource element groups, wherein the two resource element groups occupy two contiguous OFDM symbols in the time domain, and occupy 12 contiguous subcarriers in the frequency domain.

14. The apparatus according to claim 10, wherein each resource element set of the at least one resource element set has six resource element groups, wherein the six resource element groups occupy two contiguous OFDM symbols in the time domain, and occupy 36 contiguous subcarriers in the frequency domain.

15. The apparatus according to claim 10, wherein each resource element set of the at least one resource element set has three resource element groups, wherein the three resource element groups occupy three contiguous OFDM symbols in the time domain, and occupy 12 contiguous subcarriers in the frequency domain.

16. The apparatus according to claim 10, wherein each resource element set of the at least one resource element set has six resource element groups, wherein the six resource element groups occupy three contiguous OFDM symbols in the time domain, and occupy 24 contiguous subcarriers in the frequency domain.

17. The apparatus according to claim 10, wherein the at least one resource element set is interleaved based on numbers of the at least one resource element set.

18. The apparatus according to claim 10, wherein the control channel is a physical downlink control channel (PDCCH).

19. A non-transitory computer-readable storage medium comprising executable instructions, wherein the executable instructions, when executed by at least one processor of an apparatus, cause the apparatus to:

receive configuration information of a control channel, wherein the configuration information of the control channel includes time-domain configuration information of a time-frequency resource of the control channel and configuration information of at least one resource element set, wherein the time-frequency resource of the control channel corresponds to at least one control channel element, each control channel element of the at least one control channel element has six resource element groups, each control channel element of the at least one control channel element includes one or more of the at least one resource element set, each resource element group of the six resource element groups belongs to one of the one or more of the at least one resource element set, and a quantity of resource element groups in each resource element set of the at least one resource element set is two, three, or six, and wherein each resource element group of the six resource element groups occupies one orthogonal frequency division multiplexing (OFDM) symbol in time domain, and occupies 12 contiguous subcarriers in frequency domain; and detect the control channel based on the configuration information of the control channel.

20. The non-transitory computer-readable storage medium according to claim 19, wherein each resource element set of the at least one resource element set has two resource element groups, wherein the two resource element groups occupy one OFDM symbol in the time domain, and occupy 24 contiguous subcarriers in the frequency domain; or the two resource element groups occupy two contiguous OFDM symbols in the time domain, and occupy 12 contiguous subcarriers in the frequency domain.

21. The non-transitory computer-readable storage medium according to claim 19, wherein each resource element set of the at least one resource element set has six resource element groups, wherein the six resource element groups occupy one OFDM symbol in the time domain, and occupy 72 contiguous subcarriers in the frequency domain; or the six resource element groups occupy two contiguous OFDM symbols in the time domain, and occupy 36 contiguous subcarriers in the frequency domain; or the six resource element groups occupy three contiguous OFDM symbols in the time domain, and occupy 24 contiguous subcarriers in the frequency domain.

22. The non-transitory computer-readable storage medium according to claim 19, wherein each resource element set of the at least one resource element set has three resource element groups, wherein the three resource element groups occupy three contiguous OFDM symbols in the time domain, and occupy 12 contiguous subcarriers in the frequency domain.

23. The non-transitory computer-readable storage medium according to claim 19, wherein the at least one resource element set is interleaved based on numbers of the at least one resource element set.

24. The non-transitory computer-readable storage medium according to claim 19, wherein the control channel is a physical downlink control channel (PDCCH).

25. The method according to claim 1, wherein the method further comprises:

obtaining control information, wherein the control information is on the at least one resource element set.

26. The apparatus according to claim 10, wherein the executable instructions, when executed by the at least one processor of the apparatus, further cause the apparatus to:

obtain control information, wherein the control information is on the at least one resource element set.

27. The non-transitory computer-readable storage medium according to claim 19, wherein the executable instructions, when executed by the at least one processor of the apparatus, further cause the apparatus to:

obtain control information, wherein the control information is on the at least one resource element set.

* * * * *